(12) United States Patent
Asano et al.

(10) Patent No.: US 9,823,111 B2
(45) Date of Patent: Nov. 21, 2017

(54) METHOD AND DEVICE FOR ESTIMATING LOADING STATE OF VEHICLE

(75) Inventors: Tomotaka Asano, Susono (JP); Takemi Murayama, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 674 days.

(21) Appl. No.: 14/368,847

(22) PCT Filed: Dec. 27, 2011

(86) PCT No.: PCT/JP2011/080229
§ 371 (c)(1),
(2), (4) Date: Jun. 26, 2014

(87) PCT Pub. No.: WO2013/098944
PCT Pub. Date: Jul. 4, 2013

(65) Prior Publication Data
US 2014/0365171 A1 Dec. 11, 2014

(51) Int. Cl.
*G01G 19/08* (2006.01)
*B60W 40/13* (2012.01)
*B60T 8/1755* (2006.01)

(52) U.S. Cl.
CPC ............ *G01G 19/08* (2013.01); *B60W 40/13* (2013.01); *B60T 8/1755* (2013.01); *B60T 2240/06* (2013.01); *B60W 2040/1307* (2013.01); *B60W 2520/125* (2013.01); *B60W 2520/14* (2013.01); *G01G 19/086* (2013.01)

(58) Field of Classification Search
USPC ........................................... 702/174
See application file for complete search history.

(56) References Cited

U.S. PATENT DOCUMENTS 6,175,796 B1 * 1/2001 Ishikawa .............. B60G 17/005
187/222
2003/0144767 A1 * 7/2003 Brachert ................. B60C 19/00
701/1
(Continued)

FOREIGN PATENT DOCUMENTS

| EP | 2 380 795 A1 | 10/2011 |
| JP | 2011-13023 | 1/2011 |
| WO | 2011/036820 A1 | 3/2011 |

OTHER PUBLICATIONS

International Search Report dated Feb. 21, 2012, in PCT/JP2011/080229, filed Dec. 27, 2011.

*Primary Examiner* — Paul D Lee
(74) *Attorney, Agent, or Firm* — Oblon, McClelland, Maier & Neustadt, L.L.P.

(57) ABSTRACT

A predetermined relationship among various loading states, stability factor (Kh) of a vehicle and lateral acceleration (Gy) of the vehicle is stored in a storage device (30A) as a reference relationship (i.e. a map). Information regarding a lateral acceleration (Gy) of the vehicle is acquired using a lateral acceleration sensor (40). An estimated value of the stability factor (Kh) of the vehicle is calculated on the basis of vehicle travelling data when turning. A loading state of the vehicle is estimated on the basis of the area in which the estimated value of the stability factor and the lateral acceleration of the vehicle which is at the same point in time as the vehicle travelling data which were provided for the calculation of the estimated value belong in the reference relationship.

12 Claims, 13 Drawing Sheets

(56) References Cited

U.S. PATENT DOCUMENTS

| | | | |
|---|---|---|---|
| 2004/0176889 A1* | 9/2004 | Capito | B60G 17/0162 |
| | | | 701/37 |
| 2007/0169969 A1* | 7/2007 | Hummel | B62D 7/144 |
| | | | 180/24.01 |
| 2009/0084623 A1* | 4/2009 | Dagenais | B60T 8/1706 |
| | | | 180/210 |
| 2012/0173040 A1 | 7/2012 | Yokota | |

* cited by examiner

FIG. 16
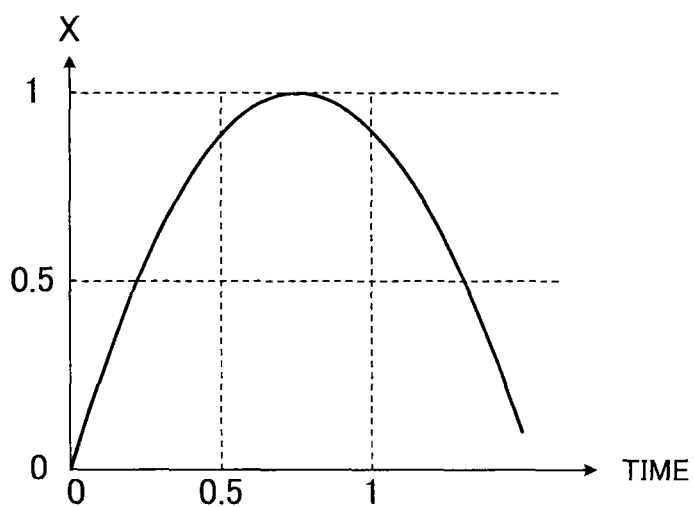
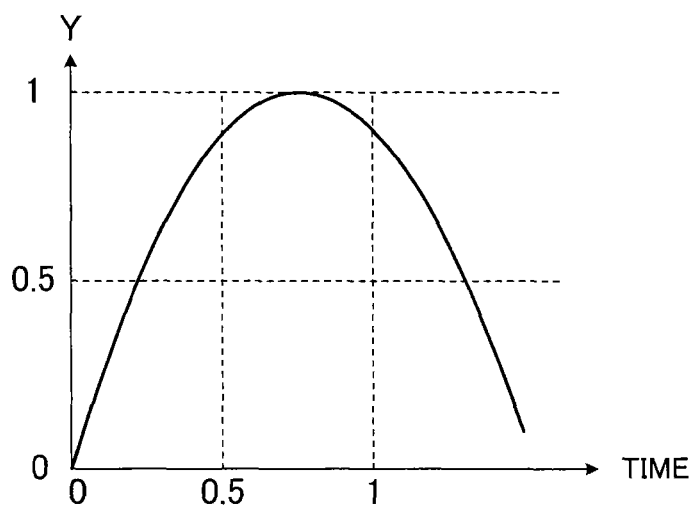
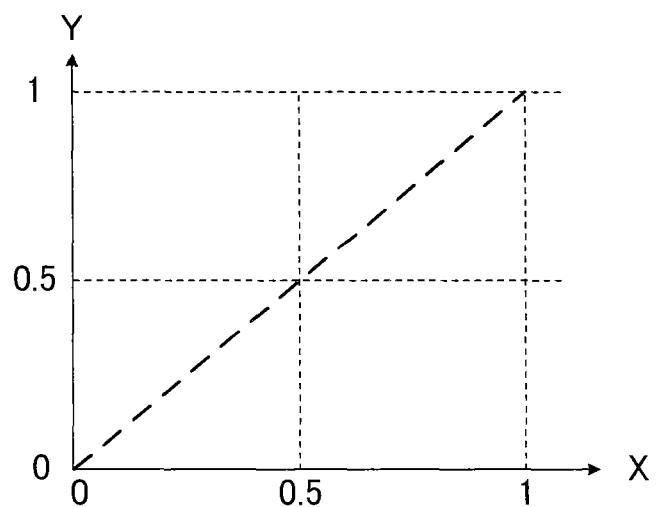

FIG. 17
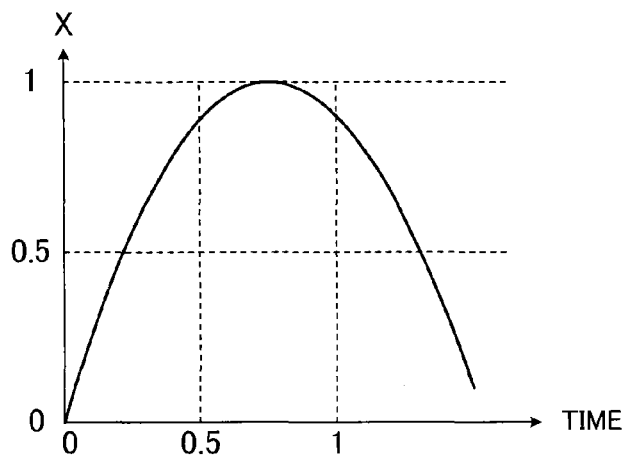
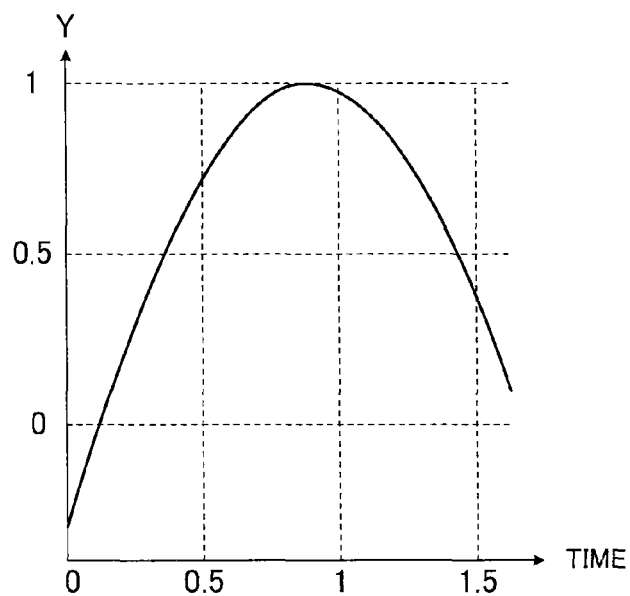
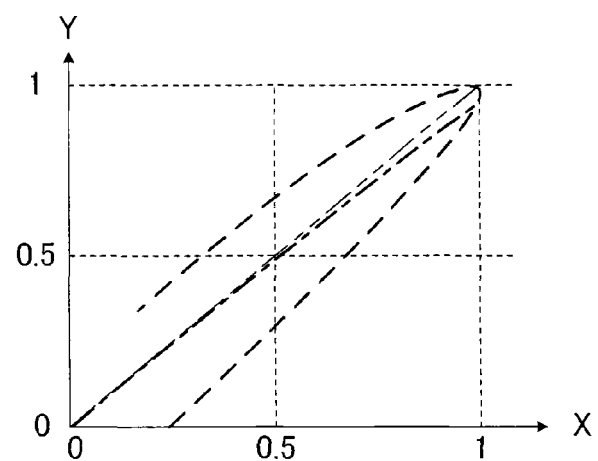

FIG. 18
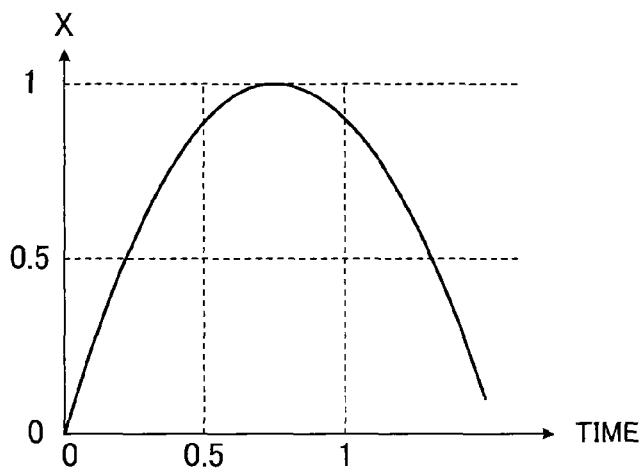
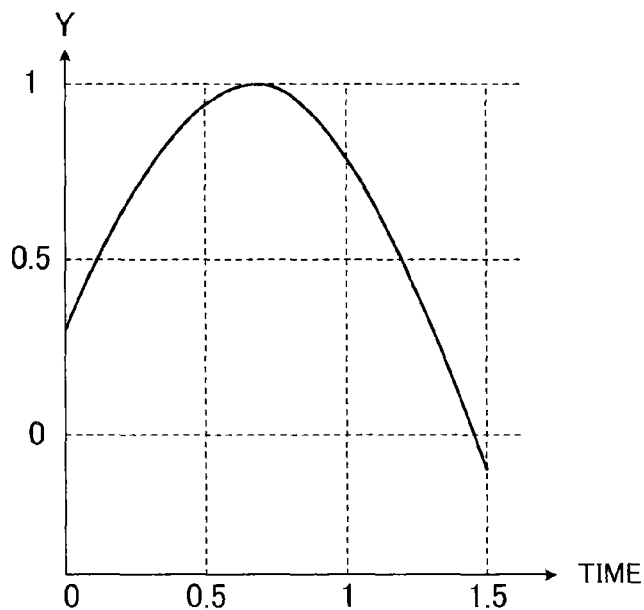
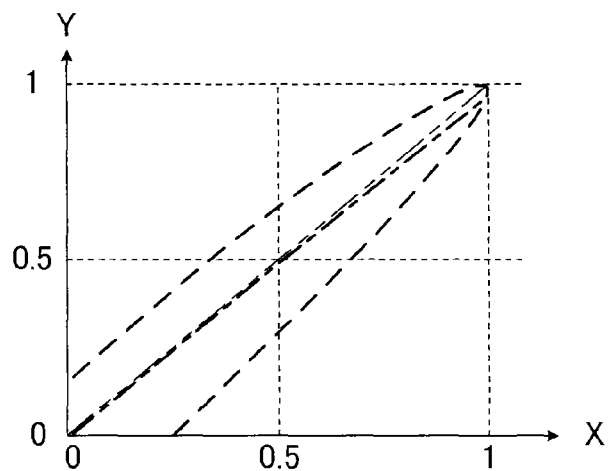

METHOD AND DEVICE FOR ESTIMATING LOADING STATE OF VEHICLE

TECHNICAL FIELD

The present invention relates to a method and a device for estimating a loading state of a vehicle and, more particularly, to a method and a device for estimating a loading state of a vehicle utilizing a relationship among various predetermined loading states, stability factor of the vehicle and lateral acceleration of the vehicle.

BACKGROUND ART

Methods and devices for estimating a loading state of a vehicle have already been known. For example, a method and a device for estimating a loading state of a vehicle are described in the under-mentioned patent citation 1, in which a relationship of phase difference between steering angle and yaw rate relative to steering angular velocity is predetermined and a loading state of a vehicle is estimated on the basis of a detected relationship of phase difference between steering angle and yaw rate relative to steering angular velocity and the predetermined relationship.

CITATION LIST

Patent Literature 1: Japanese Patent Application Laid-open Publication No. 2011-013023

SUMMARY OF INVENTION

Technical Problem

The conventional method and device for estimating a loading state described in the above-mentioned patent citation 1 make use of a phenomena that turning response of a vehicle to steering operation varies according to a loading state of the vehicle. While a phase difference between steering angle and yaw rate is large in magnitude in a situation where the magnitude of steering angular velocity is large, it decreases as the magnitude of steering angular velocity decreases and assumes substantially 0 when the magnitude of steering angular velocity is very small. For that reason, the conventional method and device for estimating a loading state have their drawbacks that a loading state of a vehicle cannot be estimated in a situation where the magnitude of steering angular velocity is small or a vehicle is in a steady turn condition.

A primary object of the present invention is to provide a method and a device for estimating a loading state of a vehicle which are improved so as to estimate a loading state of a vehicle in situations broader in range than ever before.

Solution to Problem and Advantageous Effects

The present invention provides a method for estimating a loading state of a vehicle, wherein comprising: predetermining a relationship among various predetermined loading states, stability factor of the vehicle and lateral acceleration of the vehicle and storing the relationship in a storage unit as a reference relationship; acquiring information regarding a lateral acceleration of the vehicle; calculating an estimated value of the stability factor of the vehicle on the basis of vehicle travelling data when turning; and estimating a loading state of the vehicle on the basis of the relationship between the estimated value of the stability factor and the lateral acceleration of the vehicle which is at the same point in time as the vehicle travelling data which were provided for the calculation of the estimated value and the reference relationship.

The present invention also provides a device for estimating a loading state of a vehicle, wherein comprising: a storage unit which stores a predetermined relationship among various loading states, stability factor of the vehicle and lateral acceleration of the vehicle as a reference relationship; a lateral acceleration acquiring means which acquires information regarding a lateral acceleration of the vehicle; a stability factor estimation means which calculates an estimated value of the stability factor of the vehicle on the basis of vehicle travelling data when turning; and, wherein the device estimates a loading state of the vehicle on the basis of the relationship between the estimated value of the stability factor and the lateral acceleration of the vehicle which is at the same point in time as the vehicle travelling data which were provided for the calculation of the estimated value and the reference relationship.

According to these configurations, a relationship among various predetermined loading states, stability factor of the vehicle and lateral acceleration of the vehicle is predetermined and the relationship is stored in a storage unit as a reference relationship. In addition, an estimated value of the stability factor of the vehicle is calculated by a stability factor estimation means on the basis of vehicle travelling data when turning. Further, a loading state of the vehicle is estimated on the basis of the relationship between the estimated value of the stability factor and the lateral acceleration of the vehicle which is at the same point in time as the vehicle travelling data which were provided for the calculation of the estimated value and the reference relationship. When a situation arises where a loading state of the vehicle differs from that at the time point when the reference relationship is determined, the relationship between the estimated value of the stability factor and the lateral acceleration of the vehicle differs from the reference relationship, which enables to estimate a loading state of the vehicle on the basis of the actual relationship relative to the reference relationship.

The present invention provides a method for estimating a loading state of a vehicle, wherein comprising: predetermining relationships among various predetermined loading states, stability factor of the vehicle and lateral acceleration of the vehicle for a plurality of sections in vehicle classification by weight and storing the relationships in a storage unit as reference relationships; acquiring information regarding a lateral acceleration of the vehicle; calculating an estimated value of the stability factor of the vehicle on the basis of vehicle travelling data when turning; acquiring information regarding a weight of the vehicle; determining a section in the vehicle classification by weight and a reference relationship on the basis of the weight of the vehicle; and estimating a loading state of the vehicle on the basis of the relationship between the estimated value of the stability factor and the lateral acceleration of the vehicle which is at the same point in time as the vehicle travelling data which were provided for the calculation of the estimated value and the determined reference relationship.

The present invention also provides a device for estimating a loading state of a vehicle, wherein comprising: a storage unit which stores predetermined relationships among various loading states, stability factor of the vehicle and lateral acceleration of the vehicle as reference relationships for a plurality of sections in vehicle classification by weight; a lateral acceleration acquiring means which acquires information regarding a lateral acceleration of the vehicle; a stability factor estimation means which calculates an estimated value of the stability factor of the vehicle on the basis of vehicle travelling data when turning; and a vehicle weight acquiring means which acquires information regarding a weight of the vehicle; and, wherein the device determines a section in the vehicle classification by weight and a reference relationship on the basis of the weight of the vehicle and estimates a loading state of the vehicle on the basis of the relationship between the estimated value of the stability factor and the lateral acceleration of the vehicle which is at the same point in time as the vehicle travelling data which were provided for the calculation of the estimated value and the determined reference relationship.

According to these configurations, reference relationships are predetermined for a plurality of sections in vehicle classification by weight. A section in the vehicle classification by weight and a reference relationship are determined on the basis of the weight of the vehicle, and a loading state of the vehicle is estimated on the basis of the relationship between the estimated value of the stability factor and the lateral acceleration of the vehicle and the determined reference relationship. Therefore, even in a situation where a loading state of the vehicle differs from a standard loading state and the weight of the vehicle differs relatively largely from a standard weight, a loading state of the vehicle can preferably be estimated.

Even when steering angular velocity is small, including the event where it is nearly 0, turning of a vehicle generates lateral acceleration. Stability factor of a vehicle assumes various values according to the loading state of the vehicle. Consequently, when the loading state of a vehicle varies, the above-mentioned relationship differs from the reference relationship.

Therefore, according to the above-described four configurations, a loading state of a vehicle can preferably be estimated based on the loading state of the vehicle having the reference relationship even in a situation where the magnitude of steering angular velocity is small or the vehicle is in a steady turn condition.

The above-mentioned configurations may be such that: a loading state is estimated as one of the various loading states.

According to the configurations, a loading state can be estimated as one of the various loading states with which a reference relationship was predetermined or reference relationships were predetermined.

The above-mentioned configurations may be such that: with an index value of the deviation between a transient yaw rate of the vehicle having a relationship of first order delay relative to a standard yaw rate of the vehicle and an actual yaw rate of the vehicle being referred to as a yaw rate deviation index value, a stability factor of the vehicle is estimated on the basis of the relationship between a vehicle lateral acceleration removed of the components having a frequency equal to or lower than a first predetermined value and a yaw rate deviation index value removed of the components having a frequency equal to or lower than a second predetermined value.

According to the configurations, since the stability factor of a vehicle can be estimated even in a situation where the magnitude of steering angular velocity is small, a loading state of a vehicle can preferably be estimated even in a situation where the magnitude of steering angular velocity is small.

According to the configurations, it is possible to remove steady detection errors such as those due to zero point offset of detection means for detecting a lateral acceleration of the vehicle by removing components having a frequency which is not larger than a prescribed value from a detected value of lateral acceleration of the vehicle. Similarly, it is possible to remove steady detection errors such as those due to zero point offset of detection means for detecting a state quantity of the vehicle by removing components having a frequency which is not larger than a prescribed value from a value for calculating a yaw rate deviation index value.

In a two-wheel model of a vehicle shown in FIG. 13, the mass and yaw inertia moment of the vehicle are denoted by M and I, respectively; the distances between a gravity center 102 of the vehicle and front wheel axle and rear wheel axle are denoted by Lf and Lr, respectively; and wheel base of the vehicle is denoted by L(=Lf+Lr). Cornering forces of a front vehicle wheel 100$f$ and rear vehicle wheel 100$r$ are denoted by Ff and Fr, respectively, and Cornering powers of the front wheel and the rear wheel are denoted by Kf and Kr, respectively. Actual steered angle of the front wheel 100$f$ is denoted by $\delta$; slip angles of the front wheel and the rear wheel are denoted by $\beta_f$ and $\beta_r$, respectively; and slip angle of the vehicle body is denoted by $\beta$. Lateral acceleration of the vehicle is denoted by Gy; yaw rate of the vehicle is denoted by $\gamma$; vehicle speed is denoted by V and yaw angular acceleration of the vehicle (differential value of yaw rate $\gamma$) is denoted by $\gamma d$. Under-described equations 1 to 6 are derived from the equilibrium of forces and moment, and the likes.

$$MGy = Ff + Fr \quad (1)$$

$$I\gamma d = LfFf - LrFr \quad (2)$$

$$Ff = -Kf\beta f \quad (3)$$

$$Fr = -Kr\beta r \quad (4)$$

$$\beta f = \beta + (Lf/V)\gamma - \delta \quad (5)$$

$$\beta r = \beta + (Lr/V)\gamma \quad (6)$$

Based on the above-described equations 1 to 6, the under-mentioned equation 7 is established.

$$\left(\frac{Lr}{Kf} - \frac{Lf}{Kr}\right)\frac{M}{L}Gy + \left(\frac{1}{Kf} + \frac{1}{Kr}\right)\frac{I}{L}\gamma d = \delta - \frac{L}{V}\gamma \quad (7)$$

Vehicle speed V is now assumed to be constant and Laplace operator is denoted by s. By Laplace transforming of the above-described equation 7 and rearranging it with respect to yaw rate $\gamma$, the under-mentioned equations 8 to 10 are established and by these equations a standard yaw rate $\gamma$ (s) is derived.

$$\gamma(s) = \frac{1}{1 + TpVs}\left(\frac{\delta(s)}{L} - KhGy(s)\right)V \quad (8)$$

$$Kh = \frac{M}{L^2}\left(\frac{Lr}{Kf} - \frac{Lf}{Kr}\right) \quad (9)$$

$$Tp = \frac{I}{L^2}\left(\frac{1}{Kf} + \frac{1}{Kr}\right) \quad (10)$$

Kh in the above-described equation 9 is a stability factor and Tp in the above-described equation 10 is a coefficient multiplied to a vehicle speed V in a time constant of the first order delay system having a time constant which is dependent on vehicle speed, that is, the coefficient referred to in this specification as "a time constant coefficient of steering response". These values are parameters which characterize a steering response in connection with yaw movement of the vehicle and represent a turning characteristic of the vehicle. The above-described equation 8 is an equation for calculating a yaw rate γ of a vehicle on the basis of actual steered angle δ of front wheel, vehicle speed V and lateral acceleration Gy. The yaw rate calculated from the linearized model is referred to as a transient yaw rate γtr. The transient yaw rate γtr has a first order delay relationship relative to a steady-state standard yaw rate γt represented by the under-mentioned equation 11.

$$\gamma t = \left(\frac{\delta}{L} - KhGy\right)V \tag{11}$$

Therefore, the above-mentioned configuration may be such that: a transient yaw rate γtr is calculated in accordance with the under-mentioned equation 12 corresponding to the above-described equation 8.

$$\gamma tr = \frac{1}{1 + TpVs}\gamma t \tag{12}$$

$$= \frac{1}{1 + TpVs}\left(\frac{\delta}{L} - SKhGy\right)V$$

The deviation Δγt between a steady-state yaw rate γt and a detected yaw rate γ during the steady-state turning of the vehicle is represented by the following equation 13, in which designed value and the true value of stability factor are denoted by Khde and Khre, respectively.

$$\Delta\gamma t = \left(\frac{V\delta}{L} - KhdeGyV\right) - \gamma \tag{13}$$

$$= \left(\frac{V\delta}{L} - KhdeGyV\right) - \left(\frac{V\delta}{L} - KhreGyV\right)$$

$$= (Khre - Khde)GyV$$

By multiplying L/V on both sides of the above equation 13 to convert the yaw rate deviation Δγt into the steered angle deviation Δδt of the front wheel, the latter can be expressed by the following equation 14. The steered angle deviation Δδt of the front wheel is one of the indexes of the deviation between a steady-state yaw rate γt and a detected yaw rate γ and is not dependent on vehicle speed.

$$\Delta\delta t = (Khre - Khde)GyL \tag{14}$$

The steered angle deviation Δδt of the front wheel can be calculated as an index of the deviation between a steady-state yaw rate γt and a detected yaw rate γ in accordance with the above-mentioned equation 14.

It is apparent from the equation 14 that an estimated value Khp of stability factor can be calculated in accordance with the under-mentioned equation 15 by determining the relationship between a steady-state yaw rate γt and a detected yaw rate γ, that is, an inclination (Khre−Khde)L of the relationship between vehicle lateral acceleration Gy and steered angle deviation Δδt of the front wheel on an orthogonal coordinate system with a least-squares method or the like.

$$Khp = Khde + \text{inclination}/L \tag{15}$$

Assume that errors of zero point offset in the sensors in connection with yaw rate γ of the vehicle, lateral acceleration Gy of the vehicle, and steered angle of the front wheels are γ0, Gy0 and δ0, respectively. Then, detected values of yaw rate γ of the vehicle, lateral acceleration Gy of the vehicle, and steered angle of the front wheels are γ+γ0, Gy+Gy0 and δ+δ0, respectively. Accordingly, the deviation Δγt between steady-state standard yaw rate γt and detected yaw rate γ when the vehicle is under steady-state turn condition can be expressed by the following equation 16.

$$\Delta\gamma t = \left(\frac{V(\delta + \delta 0)}{L} - Khde(Gy + Gy0)V\right) - (\gamma + \gamma 0) \tag{16}$$

$$= \left(\frac{V(\delta + \delta 0)}{L} - Khde(Gy + Gy0)V\right) - \left(\frac{V\delta}{L} - KhreGyV + \gamma 0\right)$$

$$= (Khre - Khde)GyV + \frac{V\delta 0}{L} - KhdeGy0V - \gamma 0$$

By multiplying L/V on both sides of the above equation 16 to convert the yaw rate deviation Δγt into the steered angle deviation Δδt of the front wheel, the latter can be expressed by the following equation 17. The relationship between lateral acceleration Gy of the vehicle and steered angle deviation Δδt of the front wheels represented by the following equation 17 is as shown in FIG. 14.

$$\Delta\delta t = (Khre - Khde)GyL + \delta 0 - KhdeGy0L - \frac{\gamma 0L}{V} \tag{17}$$

While "δ0−KhdeGy0L" is constant, γ0L/V changes according to vehicle speed V. Accordingly, the intercept of the axis of ordinate shown in FIG. 14 varies according to vehicle speed V. Therefore, when a detection error due to zero point offset in a sensor is included in the detected value of yaw rate γ of the vehicle, the relationship of the steered angle deviation Δδt of the front wheel relative to lateral acceleration Gy varies according to vehicle speed V, which precludes to estimate the stability factor accurately.

In order to estimate the stability factor accurately, measures are required, such as estimation of stability factor at each vehicle speed. Accordingly, huge data are required to estimate the stability factor which burdens too much load on the turning characteristic estimation device and demands too long time in the estimation of stability factor.

Vehicle lateral acceleration removed of the components having a frequency equal to or lower than a first predetermined value is denoted by Gyft and yaw rate deviation index value removed of the components having a frequency equal to or lower than a second predetermined value is denoted by Δδtft. If the first and the second predetermined values are set to values which are sufficiently higher than varying speed of γ0L/V associated with the varying of vehicle speed V, Gyft does not include the error Gy0 and Δδtft does not include errors due to the errors γ0 and δ0. Accordingly, the following equation 18 corresponding to the above-mentioned equation 14 stands. The relationship between lateral acceleration Gyft and steered angle deviation Δδtft of the front wheels represented by the following equation 18 is as shown in FIG. 15. The line of the equation 18 passes the point of origin irrespective of vehicle speed V.

$$\Delta\delta tft = (Khre - Khde)GyftL \tag{18}$$

Therefore, an estimated value Khp of stability factor can be obtained without being affected by the error due to zero point offset in sensors by determining the relationship between lateral acceleration Gyft and steered angle deviation Δδtft of the front wheel, that is, an inclination (Khre−Khde)L of the relationship between vehicle lateral acceleration Gy and steered angle deviation Δδt of the front wheel on an orthogonal coordinate system, and calculating an estimated value Khp of stability factor in accordance with the above-described equation 15.

Therefore, the above-mentioned configuration may be such that: an estimated value Khp of stability factor is calculated in accordance with the above-described equation 15 in which the ratio of steered angle deviation Δδtft of the front wheels relative to lateral acceleration Gyft is denoted by inclination.

FIGS. 16 to 18 are graphs showing two time-series waves X and Y and a Lissajous curve of waves X and Y. In particular, FIG. 16 is a graph for the case where there is no phase difference between the two time-series waves X and Y; FIG. 17 is a graph for the case where the time-series wave Y lags the time-series wave X in phase; and FIG. 18 is a graph for the case where the time-series wave Y leads the time-series wave X in phase. In FIGS. 17 and 18, in particular, bold dashed lines indicate Lissajous's waveforms of integrated values of X and integrated values of Y.

It is understood from FIGS. 16 to 18 that even when the integrated values X and Y have a phase difference therebetween, utilizing the ratio of the integrated value Y relative to the integrated value X enables to obtain the ratio Y/X in which the influence of the phase difference is reduced.

Therefore, the above-mentioned configuration may be such that: an estimated value Khp of stability factor is calculated in accordance with the above-described equation 15 in which the ratio of the integrated value Δδtfa of steered angle deviation Δδtft of the front wheels relative to the integrated value Gyfta of lateral acceleration Gyft is denoted by inclination.

While in the above, steady-state turning of a vehicle is described, in the transient turning of a vehicle, a first order delay filtering is conducted on steered angle deviation Δδtft of the front wheels and the integrated value Δδtfa thereof and a first order delay filtering is as well conducted on lateral acceleration Gyft and the integrated value Gyfta thereof. If the time constants in the first order delay filtering procedures are set to the same value, the inclination can be calculated on the basis of the first order delay filtered values as in a steady-state turning of a vehicle and an estimated value of stability factor can be calculated in accordance with the above-mentioned equation 15.

The above-mentioned configurations may be such that: the vehicle is an automobile and the various loading states include a standard state where two occupants are on board, a forwardly loaded state where forward loading is larger than in the standard state and a rearwardly loaded state where rearward loading is larger than in the standard state.

The above-mentioned configurations may be such that: a threshold value of dead zone in vehicle travel control is changed according to an estimated loading state of the vehicle.

The above-mentioned configurations may be such that: the vehicle weight acquiring means estimates a weight of the vehicle on the basis of a relationship between acceleration and deceleration operations of a driver and acceleration and deceleration of the vehicle.

The above-mentioned configurations may be such that: a lateral acceleration acquiring means detects a lateral acceleration of the vehicle.

The above-mentioned configurations may be such that: a lateral acceleration acquiring means acquires a lateral acceleration of the vehicle as a product of a yaw rate of the vehicle and a vehicle speed.

The above-mentioned configurations may be such that: a stability factor of the vehicle is estimated on the basis of the relationship between vehicle lateral acceleration removed of the components having a frequency equal to or lower than a first predetermined value and yaw rate deviation index value removed of the components having a frequency equal to or lower than a second predetermined value.

The above-mentioned configuration may be such that: the component having a frequency equal to or lower than a first predetermined value is removed from a lateral acceleration by a high-pass filtering procedure and the component having a frequency equal to or lower than a second predetermined value is removed from a yaw rate deviation index value by a high-pass filtering procedure.

The above-mentioned configuration may be such that: the first and second predetermined values are same to each other.

The above-mentioned configuration may be such that: assuming vehicle speed is denoted by V and wheelbase of a vehicle is denoted by L, the value in which a deviation between a transient yaw rate and an actual yaw rate is transferred to steered angle deviation of the front wheels is calculated by multiplying L/V to the magnitude of a deviation between a transient yaw rate and an actual yaw rate.

BRIEF DESCRIPTION OF THE DRAWINGS

FIG. 16 is a graph showing two time-series waves X and Y and a Lissajous curve of waves X and Y for the case where there is no phase difference between the two time-series waves X and Y.

FIG. 17 is a graph showing two time-series waves X and Y and a Lissajous curve of waves X and Y for the case where the time-series wave Y lags the time-series wave X in phase.

FIG. 18 is a graph showing two time-series waves X and Y and a Lissajous curve of waves X and Y for the case where the time-series wave Y leads the time-series wave X in phase.

MODE FOR CARRYING OUT THE INVENTION

The present invention will now be described in detail with respect to preferred embodiments by referring to the accompanying drawings.

First Embodiment

Figure 1:
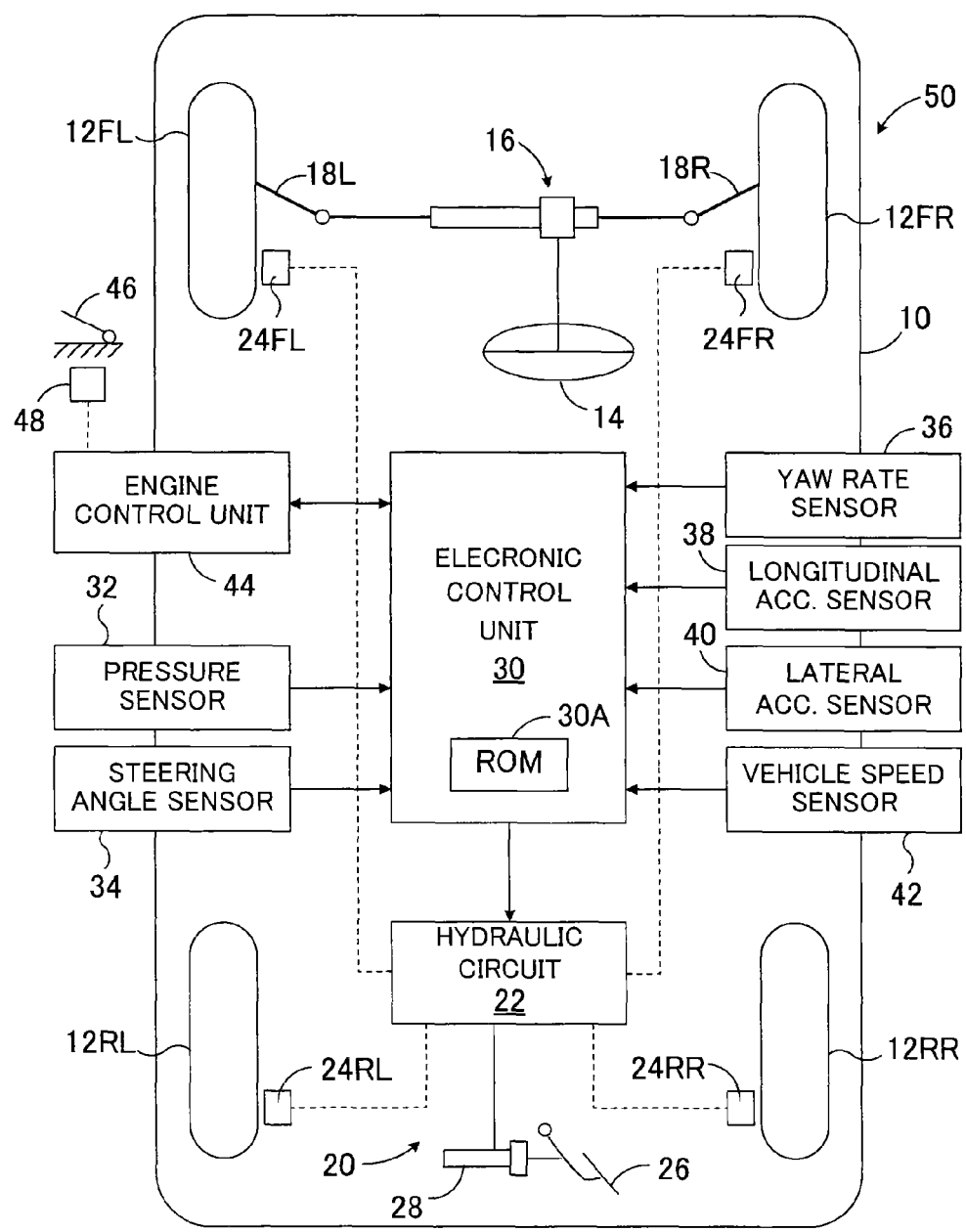
FIG. 1 is a schematic diagram showing a first embodiment of a method and a device for estimating a loading state of a vehicle according to the present invention.

FIG. 1 is a schematic diagram showing a first embodiment of a method and a device for estimating a loading state of a vehicle according to the present invention.

In FIG. 1, 50 denotes a loading state estimating device for a vehicle 10. The vehicle 10 has a right front wheel 12FR, a left front wheel 12FL, a right rear wheel 12RR, and a left rear wheel 12RL. The right and left front wheels 12FR, 12FL, which are steerable wheels, are steered by an unillustrated steering apparatus of a rack and pinion type via right and left tie rods 18R and 18L, respectively. The steering apparatus is driven in response to steering operation of a steering wheel 14 by a driver.

Braking forces of the left and right front wheels 12FL, 12FR and the left and right rear wheels 12RL, 12RR are controlled through control of respective braking pressures of corresponding wheel cylinders 24FL, 24FR, 24RL and 24RR by a hydraulic circuit 22 of a braking apparatus 20. The hydraulic circuit 22 includes a reservoir, an oil pump, and various valve units, etc., although they are not illustrated. Pressure in each wheel cylinder is usually controlled by pressure in a master cylinder 28 driven by driver's operation of depressing a brake pedal 26, and, as will be described below in detail, it is controlled as necessary by an electronic control unit 30.

The master cylinder 28 is provided with a pressure sensor 32 for detecting master cylinder pressure Pm, i.e. the pressure in the master cylinder. A steering column to which the steering wheel 14 is coupled is provided with a steering sensor 34 for detecting a steering angle θ. The electronic control unit 30 is supplied with a signal indicating master cylinder pressure Pm detected by the pressure sensors 32 and a signal indicating steering angle θ detected by the steering angle sensor 34.

The vehicle 10 has a yaw rate sensor 36 for detecting an actual yaw rate γ of the vehicle, a longitudinal acceleration sensor 38 for detecting longitudinal acceleration Gx of the vehicle, a lateral acceleration sensor 40 for detecting a lateral acceleration Gy of the vehicle, and a vehicle speed sensor 42 for detecting vehicle speed V. The electronic control unit 30 is supplied with a signal indicating actual yaw rate γ detected by the yaw rate sensor 36 and the likes. It is to be noted that the steering sensor 34, the yaw rate sensor 36 and the acceleration sensor 40 detect a steering angle, an actual yaw rate and a lateral acceleration, respectively as positive values when the vehicle turns left.

Although not shown in detail in the figure, the electronic control unit 30 includes a microcomputer having a CPU, a ROM 30A, an EEPROM, a RAM, a buffer memory and input/output ports and these components are connected with one another by bi-directional common bus. The EEPROM stores an estimated value of stability factor Kh and the like. As explained in detail hereinafter, the estimated value of stability factor Kh and the likes are renewed by calculating them on the basis of travelling data when the vehicle is in turning condition.

The ROM 30A stores default values Kh00 and Tp00 of stability factor Kh and time constant coefficient top of steering response, respectively, which are utilized in the calculation of a standard yaw rate γt. These default values are set for each vehicle when shipping of a vehicle. The ROM 30A also serves as a storage unit which stores a relationship among various predetermined loading states, stability factor Kh and an absolute value of vehicle lateral acceleration Gy as a map.

An engine control unit 44 is provided which is supplied with a signal indicating an accelerator opening Acc from an accelerator opening sensor 48 installed on an accelerator pedal 46. The engine control unit 44 controls output of an engine, not shown, on the basis of an accelerator opening Acc, and gives and receives signals as necessary to and from the electronic control unit 30. It is to be noted that the engine control unit 44 may include a microcomputer having a CPU, a ROM, a RAM, and input/output ports and a drive circuit.

Figure 2:
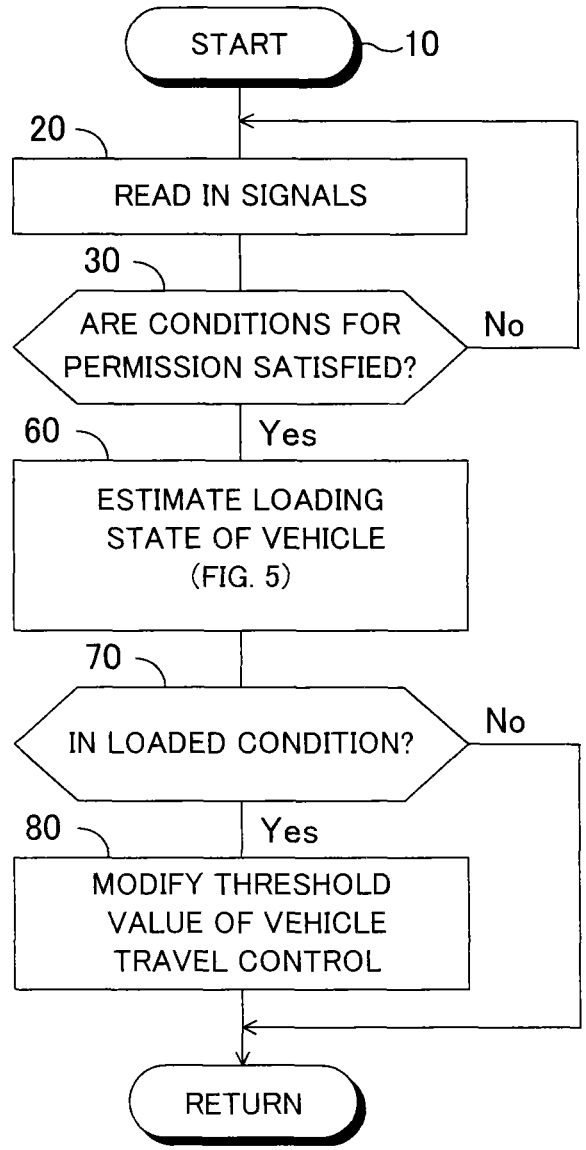
FIG. 2 is a flowchart showing a routine for estimating a loading state of the vehicle in the first embodiment.

As described below, the electronic control unit 30 estimates a loading state of the vehicle in accordance with the flowchart shown in FIG. 2. In the first embodiment, in particular, the electronic control unit 30 calculates an estimated value of stability factor Kh of the vehicle and estimates a loading state of the vehicle from the map shown in FIG. 5 on the basis of the estimated value of stability factor Kh and an absolute value of vehicle lateral acceleration Gy. In addition, when the electronic control unit 30 determines that the vehicle is in the loading state which is higher than the standard state where two occupants are on board, it modifies a control starting threshold value of a vehicle travel control such as a vehicle rollover control to a value for a high loading state.

In particular, after the vehicle starts to turn, the electronic control unit 30, by following a flowchart shown in FIG. 3 as described later, calculates a steady-state standard yaw rate γt on the basis of turn travelling data such as steering angle. In addition, the electronic control unit 30 and calculates a first order delayed transient yaw rate γtr by conducting a first order delay filtering utilizing the time constant coefficient Tp of steering response on the steady-state standard yaw rate γt. Further, the electronic control unit 30 calculates a front wheel steered angle deviation value Δδ equivalent to yaw rate deviation which is derived by transferring the difference between a transient yaw rate γtr and an actual yaw rate γ of the vehicle to a front wheel steered angle deviation.

The electronic control unit 30 calculates a first order delayed vehicle lateral acceleration Gyft by conducting a first order delay filtering utilizing the time constant coefficient Tp of steering response on the lateral acceleration Gy of the vehicle. The electronic control unit 30 calculates a band-pass filtered vehicle lateral acceleration Gyftbpf and a band-pass filtered front wheel steered angle deviation value Δδbpf equivalent to yaw rate deviation.

The electronic control unit 30 calculates an integrated value Δδa of front wheel steered angle deviation value Δδbpf equivalent to yaw rate deviation and an integrated value ΔGya of vehicle lateral acceleration Gyftbpf, and calculates a ratio Δδa/ΔGya of the integrated values. The electronic control unit 30 calculates the sum of an initial value of stability factor Kh which is utilized in the calculation of a steady-state standard yaw rate γt and an adjusting value based on the ratio Δδa/ΔGya of the integrated values as an estimated value of stability factor Kh. When a predetermined condition is satisfied, the electronic control unit 30 stores in the EEPROM the estimated value of stability factor Kh and the vehicle lateral acceleration Gy which is at the same point in time as the vehicle travelling data which were utilized to estimate the stability factor.

Next, a calculation routine for estimating a loading state of a vehicle in the first embodiment will be described with reference to the flowchart shown in FIG. 2. Control according to the flowchart shown in FIG. 2 is started when an unillustrated ignition switch is turned on, and is repeatedly executed at predetermined time intervals. The same goes in the second embodiment described hereinafter.

First, the control is started in step 10, and in step 20, signals representing vehicle lateral acceleration Gy, etc. detected by the associated sensors are read.

In step 30, a decision is made as to whether or not predetermined conditions for permission of loading state estimation are satisfied. If a negative decision is made, the control returns to step 20, while if a positive decision is made, the control proceeds to step 60. Notably, when a vehicle speed V is not smaller than a reference value; the vehicle is not accelerated or braked; and no wheel is under slip condition, a decision may be made that conditions for permission of loading state estimation are satisfied.

Figure 5:
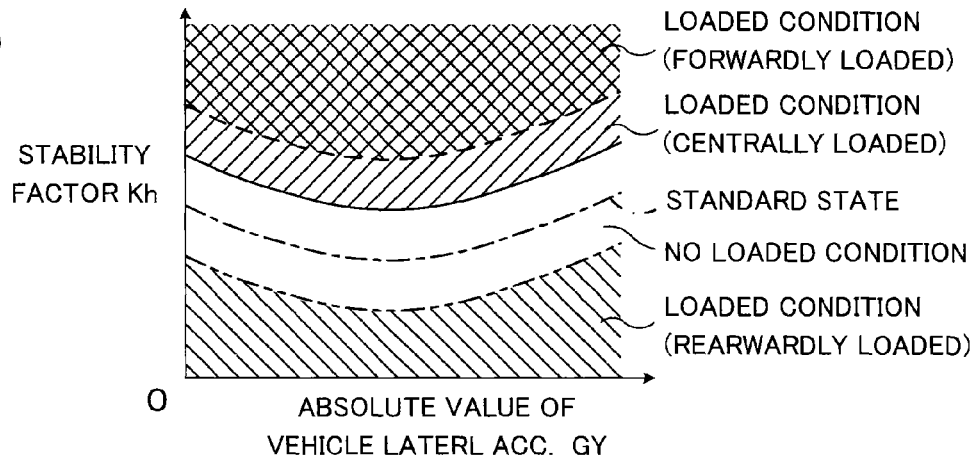
FIG. 5 is a graph showing a predetermined reference relationship among various loading states, stability factor Kh of a vehicle and lateral accelerations Gy of the vehicle.

In step 60, a loading state of the vehicle is estimated by determining an area or areas in the graph shown in FIG. 5 in which belong an odd numbers of combinations of the estimated values of stability factor Kh and vehicle lateral accelerations Gy stored in the EEPROM. When the combinations belong in a plurality of areas, a loading state is estimated on the basis of an area in which the most combinations belong.

In step 70, a decision is made as to whether or not the vehicle is in loaded condition on the basis of the estimation conducted in step 60. When the vehicle is determined to be in loaded condition, a decision is also made as to which is the loading state of the vehicle among a rearwardly loaded state where a gravity center of the vehicle is located at a rearward position than that of standard state; a centrally loaded state where a gravity center of the vehicle is located substantially at the same position as that of standard state; and a forwardly loaded state where a gravity center of the vehicle is located at a forward position than that of standard state. When a negative decision is made, that is, when the vehicle is determined to be in no loaded condition, the control returns to step 20. When an affirmative decision is made, the control proceeds to step 80.

In step 80, a control threshold value of a vehicle travel control is modified as necessary in accordance with which the estimated loading state of the vehicle is among a rearwardly loaded state, a centrally loaded state and a forwardly loaded state. It is to be understood that constants and/or coefficients in equations for calculating control values of a travel control may also be modified in accordance with the determined loading state.

Next, a calculation routine for estimating a stability factor Kh in the first embodiment will be described with reference to the flowchart shown in FIG. 3.

In step 120, signals representing steering angle θ, etc. detected by the associated sensors are read. In step 130, a low-pass filtering procedure is conducted on each signal indicating steering angle θ, etc. read in step 120 to remove high frequency noise.

In step 140, vehicle speed V is calculated on the basis of wheel speeds Vwi; a steered angle δ of the front wheels is calculated on the basis of steering angle θ; and a steady-state standard yaw rate γt is calculated in accordance with the above-mentioned equation 11.

In step 150, a time constant coefficient Tp of steering response is set to its default value Tp00 which was set in advance when the vehicle was shipped. It is to be noted that in the case where a time constant coefficient Tp of steering response is estimated on the basis of vehicle travelling data, a time constant coefficient Tp of steering response may be set to an estimated value.

In step 160, a first order delay filtering utilizing the time constant coefficient Tp of steering response is conducted in accordance with the above-mentioned equation 12 to calculate a transient yaw rate γtr based on the steady-state standard yaw rate γt calculated in step 140.

In step 170, a first order delay filtering utilizing the time constant coefficient Tp of steering response is conducted on the vehicle lateral acceleration Gy in accordance with the under-mentioned equation 19 to calculate a first order delay filtered vehicle lateral acceleration Gyft.

$$Gyft = \frac{1}{1 + TpVs} Gy \quad (19)$$

In step 180, a front wheel steered angle deviation value Δδ equivalent to yaw rate deviation is calculated in accordance with the under-mentioned equation 20, the value being derived by converting the deviation between the transient yaw rate γtr and the actual yaw rate γ to the steered angle deviation of the front wheels.

$$\Delta\delta = (\gamma tr - \gamma)\frac{L}{V} \quad (20)$$

In step 190, high-pass filtering procedures are conducted on the first order delay filtered vehicle lateral acceleration Gyft which was calculated in step 170 and the front wheel steered angle deviation value Δδ equivalent to yaw rate deviation which was calculated in step 180 to remove influences due to zero point offset in the sensors. In this connection, the high-pass filtering procedure may be a first-order high-pass filtering having a cutoff frequency which is smaller than the cutoff frequency of the low-pass filtering in step 130.

Since the low-pass filtering procedure is conducted in step 130 as described above, the above-mentioned high-pass filtering procedure generates the results obtained by conducting a band-pass filtering procedure on the first order delay filtered vehicle lateral acceleration Gyft and the front wheel steered angle deviation value Δδ equivalent to yaw rate deviation. Therefore, the vehicle lateral acceleration Gyft and the front wheel steered angle deviation value Δδ equivalent to yaw rate deviation which were high-pass filtered in step 190 are referred to a band-pass filtered vehicle lateral acceleration Gyftbpf and a band-pass filtered front wheel steered angle deviation value Δδbpf equivalent to yaw rate deviation.

In step 200, a decision is made as to whether or not the vehicle is under a turn running condition. If a negative decision is made, the control returns to step 120. If an affirmative decision is made, the control proceeds to step 210. In this connection, the decision as to whether or not the vehicle is under a turn running condition may be made by deciding whether or not the absolute value of lateral acceleration Gy of the vehicle is equal to or larger than a reference value, deciding whether or not the absolute value of actual yaw rate γ of the vehicle is equal to or larger than a reference value, or deciding whether or not the absolute value of the product of actual yaw rate γ of the vehicle and vehicle speed V is equal to or larger than a reference value, under the situation where the vehicle runs at a vehicle speed not lower than a reference value.

In step 210, a decision is made as to whether or not adjustments are to be executed on the present integrated values Ma of the band-pass filtered front wheel steered angle deviation value Δδbpf equivalent to yaw rate deviation and the present integrated values ΔGya of the band-pass filtered vehicle lateral acceleration Gyftbpf calculated in step 230 in previous cycle. If a negative decision is made, the control proceeds to step 230, while if an affirmative decision is made, the control proceeds to step 220.

It is to be understood that a decision may be made that adjustments are to be executed on the integrated values Δδa and ΔGya when either of the under-mentioned (A1) and (A2) is satisfied. A decision as to whether or not the condition (A2) is satisfied is made when a time constant coefficient Tp of steering response is estimated and a time constant coefficient Tp of steering response is set to the estimated value in step 50.

(A1) The absolute value of the difference ΔKh between the stability factor Kh when the integrated values Δδa and ΔGya were recently adjusted and the present stability factor Kh which was estimated in step 250 in the previous cycle is higher than a reference value for the deviation of the stability factor.

(A2) The absolute value of the difference ΔTp between the time constant coefficient Tp of steering response when the integrated values Δδa and ΔGya were recently adjusted and the time constant coefficient Tp of steering response which was set in step 150 in the present cycle is higher than a reference value for the deviation of time constant coefficient of steering response.

In step 220, an adjustment gain Gaj is calculated in accordance with the under-mentioned equation 21, in which a lower limit value previously set for the integrated value Δδa of the band-pass filtered front wheel steered angle deviation value Δδbpf equivalent to yaw rate deviation is denoted by Δδamin (positive constant) and a lower limit value previously set for the integrated value ΔGya of the band-pass filtered vehicle lateral acceleration Gyftbpf is denoted by ΔGymin (positive constant). It is to be noted that in the under-mentioned equation 21, MIN represents that a minimum value in the values in the bracket is selected and Max represents that a maximum value in the values in the bracket is selected. The same goes to the other similar equations.

$$Gaj = \text{MIN}\left(\text{MAX}\left(\frac{\Delta \delta amin}{|present \Delta \delta a|}, \frac{\Delta Gyamin}{|present \Delta Gya|}\right), 1\right) \quad (21)$$

In addition, in step 220, an adjusted integrated value Δδa of yaw rate deviation equivalent value Δδbpf and an adjusted integrated value ΔGya of vehicle lateral acceleration Gyftbpf are calculated in accordance with the under-mentioned equations 22 and 23, respectively.

$$\Delta \delta a = \text{present } \Delta \delta a \times Gaj \quad (22)$$

$$\Delta Gya = \text{present } \Delta Gya \times Gaj \quad (23)$$

In step 230, when the vehicle lateral acceleration Gyftbpf is positive, an integrated value Δδa of the front wheel steered angle deviation value Δδbpf equivalent to yaw rate deviation and an integrated value ΔGya of the vehicle lateral acceleration Gyftbpf are calculated in accordance with the under-mentioned equations 24 and 25, respectively.

$$\Delta \delta a = \text{present } \Delta \delta a + \Delta \delta bpf \quad (24)$$

$$\Delta Gya = \text{present } \Delta Gya + Gyftbpf \quad (25)$$

When the vehicle lateral acceleration Gyftbpf is not positive, an integrated value Δδa of the front wheel steered angle deviation value Δδbpf equivalent to yaw rate deviation and an integrated value ΔGya of the vehicle lateral acceleration Gyftbpf are calculated in accordance with the under-mentioned equations 26 and 27, respectively.

$$\Delta \delta a = \text{present } \Delta \delta a - \Delta \delta bpf \quad (26)$$

$$\Delta Gya = \text{present } \Delta Gya - Gyftbpf \quad (27)$$

In step 240, the integrated value Δδa of the front wheel steered angle deviation value Δδbpf equivalent to yaw rate deviation is divided by the integrated value ΔGya of the vehicle lateral acceleration Gyftbpf to calculate a ratio Ma/ΔGya of the integrated values.

In step 250, an estimated value of stability factor Kh is calculated in accordance with the under-mentioned equation 28 in which the designed value Khde in the above-mentioned equation 15 is set to the initial value Kh0.

$$Kh = Kh0 + (\Delta \delta a / \Delta Gya)/L \quad (28)$$

In step 260, a decision is made as to whether or not the estimated value of stability factor Kh is permitted to be stored in the EEPROM by deciding whether or not predetermined conditions for permission are satisfied. If a negative decision is made, the control returns to step 120. If an affirmative decision is made, in step 270, the estimated value of stability factor Kh is stored in the EEPROM so as to renew the estimated value of stability factor Kh stored in the EEPROM. In addition, for each predetermined cycle, the estimated value of stability factor Kh and the vehicle lateral acceleration Gy which is at the same point in time as the vehicle travelling data which were utilized to estimate the stability factor are stored in the EEPROM.

In operation of the first embodiment configured as above, when a decision is made that the predetermined conditions for permission of loading state estimation are satisfied in step 30, a loading state of the vehicle is estimated on the basis of the estimated values of stability factor Kh and vehicle lateral accelerations Gy in step 60.

Consequently, a loading state of the vehicle can positively be estimated utilizing a phenomenon where if a loading state of the vehicle changes from the standard state, the relationship between stability factor Kh of the vehicle and a vehicle lateral acceleration Gy of the vehicle changes as well.

According to the first embodiment, the essentials that have to be done are to estimate stability factor Kh of the vehicle, and to store estimated values of stability factor Kh and values of vehicle lateral acceleration Gy each of which is at the same time point as travelling data of the vehicle which were provided for the estimation of stability factor. Consequently, as compared to a second embodiment described later in which a vehicle weight W is additionally estimated, a loading state of a vehicle can easily be estimated.

According to the first embodiment, a threshold value of a vehicle travel control is modified as necessary in accordance with the loaded state in which the estimated loading state of the vehicle is among a rearwardly loaded state, a centrally loaded state and a forwardly loaded state. Consequently, as compared to where no loading state of a vehicle is estimated, start timing of the vehicle travel control can preferably be controlled in accordance with a loading state of a vehicle.

Second Embodiment

Figure 4:
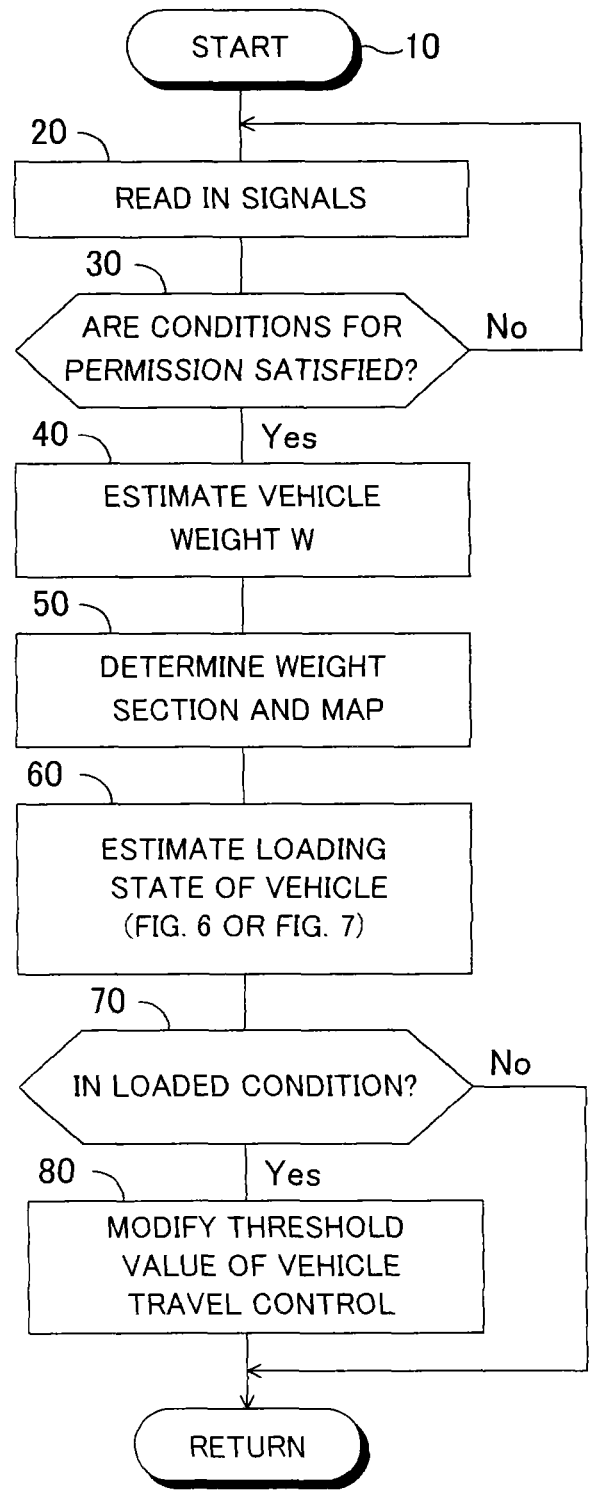
FIG. 4 is a flowchart showing a routine for estimating a loading state of the vehicle in a second embodiment of the method and device for estimating a loading state of a vehicle according to the present invention.

FIG. 4 is a flowchart showing a routine for estimating a loading state of the vehicle in a second embodiment of the method and device for estimating a loading state of a vehicle according to the present invention. In FIG. 4, the same steps as those shown in FIG. 2 are denoted by the same step numbers as in FIG. 2.

In the second embodiment, when an affirmative decision is made in step 30, a vehicle weight W is estimated and stored in the EEPROM in step 40. It is to be understood that a vehicle does not change its weight during travelling, the step may be skipped in a situation where a vehicle weight W has already been estimated after the start of travelling.

A vehicle weight W may be estimated as follows: First, a longitudinal acceleration of the vehicle is estimated on the basis of braking and driving operations of a driver. For example, an estimated longitudinal acceleration Gxh of the vehicle is calculated on the basis of a master cylinder pressure Pm which indicates a braking operation amount of the driver when braking and is calculated on the basis of an accelerator opening Acc which indicates a driving operation amount of the driver when driving. In addition, a vehicle weight W is estimated on the basis of a difference between the estimated longitudinal acceleration Gxh and a longitudinal acceleration Gx detected by the longitudinal acceleration sensor 38.

Figure 6:
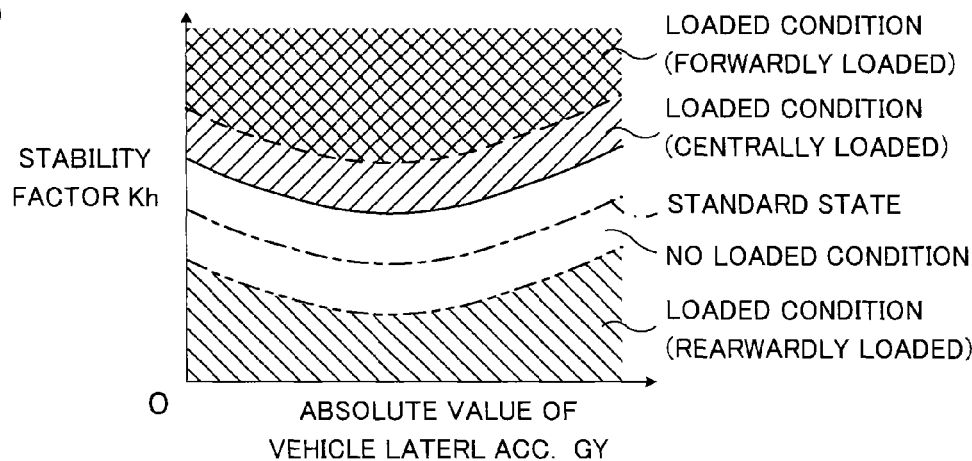
FIG. 6 is a graph showing a predetermined reference relationship among various loading states, stability factor Kh of a vehicle and lateral accelerations Gy of the vehicle for a light section in vehicle classification by weight.
Figure 7:
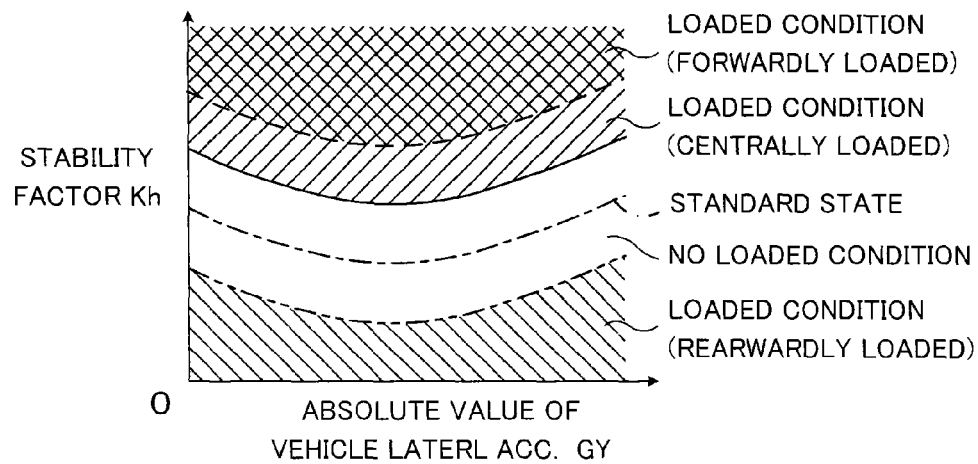
FIG. 7 is a graph showing a predetermined reference relationship among various loading states, stability factor Kh of a vehicle and lateral accelerations Gy of the vehicle for a heavy section in vehicle classification by weight.

In step 50, with a light weight section being set for a vehicle weight which is not larger than a reference weight WO (a positive constant) and a heavy weight section being set for a vehicle weight which is larger than the reference weight WO, a determination is made as to in which section the estimated vehicle weight W is. When the estimated vehicle weight W is determined to be a value in the light weight section, a map for estimating a loading state of the vehicle is set to the map for the light weight section shown in FIG. 6. On the other hand, when the estimated vehicle weight W is determined to be a value in the heavy weight section, a map for estimating a loading state of the vehicle is set to the map for the heavy weight section shown in FIG. 7. It is to be noted that the numbers of weight sections and maps may be three or more.

In step 60, a loading state of the vehicle is estimated utilizing a map set in step 50 in the same manner as in step 60 in the first embodiment and, subsequently, step 70 is conducted in the same manner as in the first embodiment.

In step 80, a control threshold value of a vehicle travel control is modified as necessary in accordance with which the loading state of the vehicle is among a rearwardly loaded state, a centrally loaded state and a forwardly loaded state and the estimated vehicle weight W. It is to be understood that constants and/or coefficients in equations for calculating control values of a travel control may also be modified in accordance with the determined loading state and the estimated vehicle weight W.

Thus, according to the second embodiment, as in the above-described first embodiment, a loading state of the vehicle can positively be estimated utilizing a phenomenon where if a loading state of the vehicle changes from the standard state, the relationship between stability factor Kh of the vehicle and a vehicle lateral acceleration Gy of the vehicle changes as well.

According to the second embodiment, a vehicle weight W is estimated and a map for estimating a loading state of the vehicle is determined on the basis of the estimated vehicle weight W. Consequently, a loading state of the vehicle can appropriately be estimated even in a vehicle where live load such as number of occupants in a vehicle and loaded cargo greatly varies.

According to the second embodiment, a threshold value of a vehicle travel control is modified as necessary in accordance with which the estimated loading state of the vehicle is among a rearwardly loaded state, a centrally loaded state and a forwardly loaded state and the vehicle weight W. Consequently, as compared to where vehicle weight W is not considered, start timing of the vehicle travel control can preferably be controlled in accordance with vehicle weight.

Figure 3:
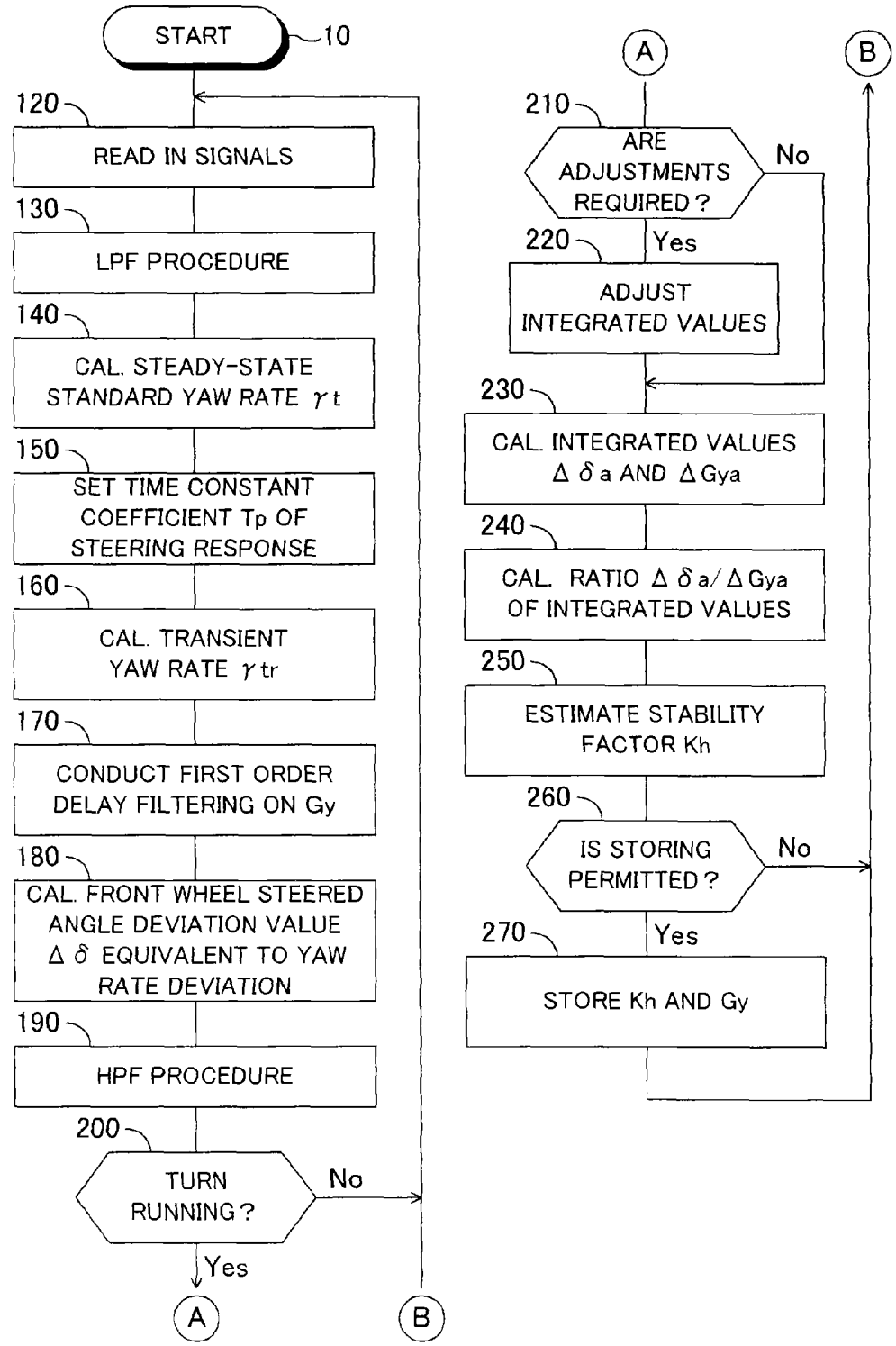
FIG. 3 is a flowchart showing a routine for calculating a stability factor Kh by estimation in the first embodiment.

According to the above-described first and second embodiments, in particular, an estimated value of stability factor Kh is calculated in accordance with the flowchart shown in FIG. 3, which enables to estimate stability factor Kh of a vehicle even in such a situation where steering angular velocity is small in magnitude or steering is in a steady state condition. Consequently, a loading state of the vehicle can positively be estimated even in such a situation where steering angular velocity is small in magnitude or a steady state steering is conducted.

In operations of the above-described first and second embodiments, an estimated value of stability factor Kh is calculated in accordance with the flowchart shown in FIG. 3.

in step 140, a steady-state standard yaw rate γt is calculated and in step 60, a transient yaw rate γtr is calculated on the basis of the steady-state standard yaw rate γt. In step 170, a first order delay filtered vehicle lateral acceleration Gyft is calculated and in step 180, a front wheel steered angle deviation value Δδ equivalent to yaw rate deviation is calculated, the value being derived by converting the deviation between the transient yaw rate γtr and the actual yaw rate γ to the steered angle deviation of the front wheels.

In step 190, high-pass filtering procedures are conducted on the first order delay filtered vehicle lateral acceleration Gyft and the front wheel steered angle deviation value Δδ equivalent to yaw rate deviation to calculate a band-pass filtered vehicle lateral acceleration Gyftbpf and a front wheel steered angle deviation value Δδbpf equivalent to band-pass filtered yaw rate deviation which is derived by transferring the magnitude of the difference between a band-pass filtered actual yaw rate γbpf and a band-pass filtered transient yaw rate γtrbpf to a front wheel steered angle deviation.

In step 230, an integrated value Δδa of the front wheel steered angle deviation value Δδopf equivalent to band-pass filtered yaw rate deviation and an integrated value ΔGya of the vehicle lateral acceleration Gyftbpf are calculated. In step 240, a ratio Δδa/ΔGya of the integrated values is calculated by dividing the integrated value Δδa of the yaw rate deviation equivalent value Δδbpf by the integrated value ΔGya of the vehicle lateral acceleration Gyftbpf.

Further, in step 250, an estimated value of stability factor Kh is calculated as a sum of the initial value Kh0 of stability factor Kh and an adjustment value based on the ratio Δδa/ΔGya of the integrated values.

Thus, according to the above-described embodiments, an estimated value of stability factor Kh can be calculated as a value which is derived by adjusting the initial value of stability factor utilized in the calculation of the steady-state standard yaw rate γt of the vehicle on the basis of the relationship between the yaw rate deviation and the vehicle lateral acceleration so that a transient yaw rate γtr of the vehicle approaches a real yaw rate. Accordingly, an estimated value of stability factor can be adjusted so that the estimated value of stability factor approaches a real stability factor, which enables to derive an estimated value of stability factor which is close to a real stability factor.

According to the above-described embodiments, in particular, a steady-state standard yaw rate γt is calculated on the basis of steering angle θ, etc. which are low-pass filtered in step 130. In step 190, high-pass filtering procedures are conducted on the vehicle lateral acceleration Gyft and the front wheel steered angle deviation value Δδ equivalent to yaw rate deviation to calculate a band-pass filtered vehicle lateral acceleration Gyftbpf and a front wheel steered angle deviation value Δδbpf equivalent to band-pass filtered yaw rate deviation. Further, in step 230, an integrated value Δδa of the front wheel steered angle deviation value Δδbpf equivalent to yaw rate deviation and an integrated value ΔGya of the vehicle lateral acceleration Gyftbpf are calculated, and in step 240, a ratio Δδa/ΔGya of the integrated values is calculated.

Therefore, it is possible to remove high frequency noise included in signals indicating detected steering angle θ, etc. and as well to remove influences due to zero point offset in the sensors. Since the vehicle lateral acceleration Gyftbpf and the front wheel steered angle deviation value Δδbpf equivalent to yaw rate deviation can be calculated without the influences due to zero point offset in the sensors, a stability factor Kh can more accurately be estimated as compared to where no high-pass filtering procedure is conducted. The number of high-pass filtering procedures can be reduced so that calculation load on the electronic control unit 30 can be alleviated as compared to where high-pass filtering procedures are conducted on steering angle θ and lateral acceleration Gy which are used to calculate a steady-state standard yaw rate γt.

It is to be understood that band-pass filtering procedures may be conducted on a vehicle lateral acceleration Gy and a front wheel steered angle deviation value Δδ equivalent to yaw rate deviation without conducting low-pass filtering procedures on steering angle θ, etc. In that case, the number of calculations required for filtering procedures can be reduced as compared with the above-described embodiments while accurately estimating a stability factor Kh and effectively removing high frequency noise so that calculation load on the electronic control unit 30 can further be alleviated.

Further, according to the above-described embodiments, a ratio Δδa/ΔGya of the integrated values is calculated which is utilized to calculate an adjusting value for adjusting the initial value Kh0 of stability factor Kh which is utilized in calculation of a steady-state standard yaw rate γt on the basis of an integrated value ΔGya of a band-pass filtered vehicle lateral acceleration Gyftbpf and an integrated value Δδa of a band-pass filtered front wheel steered angle deviation value Δδbpf equivalent to yaw rate deviation.

Therefore, it is possible to reduce the risk that stability factor Kh is inaccurately calculated due to instant fluctuations in a vehicle lateral acceleration Gyftbpf and a front wheel steered angle deviation value Δδbpf equivalent to yaw rate deviation as compared to where a ratio Δδa/ΔGya which is utilized to calculate an adjustment value is calculated on the basis of a band-pass filtered vehicle lateral acceleration Gyftbpf and a band-pass filtered front wheel steered angle deviation value Δδbpf equivalent to yaw rate deviation.

Further, according to the above-described embodiments, integrated value Δδa is calculated as the integrated value of front wheel steered angle deviation value Δδ equivalent to yaw rate deviation in which the deviation between a transient yaw rate γtr and an actual yaw rate γ is converted to the steered angle deviation of the front wheels. Accordingly, stability factor Kh can be estimated without being influenced by vehicle speed V. Therefore, stability factor Kh can accurately be estimated as compared to where an integrated value of index values of yaw rate deviation is, for example, an integrated value of the deviation between a transient yaw rate γtr and an actual yaw rate γ. It is also possible to avoid cumbersome procedures to estimate stability factor Kh for each vehicle speed V or to change stability factor Kh used to calculate a target yaw rate γtt for each vehicle speed V to thereby reduce the number of required calculations and the capacity of storing device.

Further, according to the above-described embodiments, in step 210, a decision is made as to whether or not adjustments are to be executed on the integrated values Δδa of the band-pass filtered front wheel steered angle deviation value Δδbpf equivalent to yaw rate deviation and the present integrated values ΔGya of the band-pass filtered vehicle lateral acceleration Gyftbpf. If an affirmative decision is made, an adjustment gain Gaj which is not larger than 1 is calculated in step 220. In step 230, an integrated value Δδa of the front wheel steered angle deviation value Δδbpf equivalent to yaw rate deviation and an integrated value ΔGya of the vehicle lateral acceleration Gyftbpf are calculated as integrated values which are adjusted with the adjustment gain Gaj.

Therefore, it is possible to prevent the previous integrated value Δδa of the front wheel steered angle deviation value Δδbpf equivalent to yaw rate deviation and the previous integrated value ΔGya of the vehicle lateral acceleration Gyftbpf from adversely influencing the estimation of stability factor Kh in such a situation where the deviation ΔKh between the stability factor Kh at a time when the previous integrated values Δδa and ΔGya were adjusted and the present stability factor Kh which was estimated in step 250 in previous cycle becomes large in magnitude for the reason, for example, that loading condition of the vehicle has changed significantly.

Further, according to the above-described embodiments, in step 220, an adjustment gain Gaj is calculated in accordance with the equation 21 on the basis of the integrated values Δδa of the front wheel steered angle deviation value Δδbpf equivalent to yaw rate deviation and the integrated values ΔGya of the vehicle lateral acceleration Gyftbpf. Accordingly, an adjustment gain Gaj can be variably set in accordance with the magnitude of the integrated values Δδa of the front wheel steered angle deviation value Δδbpf equivalent to yaw rate deviation and the magnitude of the integrated values ΔGya of the vehicle lateral acceleration Gyftbpf. Therefore, as compared to where the adjustment gain Gaj is constant, the risk can be reduced that an error in estimating stability factor Kh becomes large for the reason that the adjustment gain Gaj is too large, while on the other hand, the risk can as well be reduced that S/N ratio in estimating stability factor Kh decreases for the reason that the adjustment gain Gaj is too small.

Further, according to the above-described embodiments, in step 280, a decision is made as to whether or not the estimated value of stability factor Kh is permitted to be stored and if an affirmative decision is made, in step 290, the estimated value of stability factor Kh is stored in the EEPROM. Therefore, the estimated value of stability factor Kh can be stored in the EEPROM at a stage when the estimated value of stability factor Kh substantially conforms to an actual stability factor. That is, it is possible to repeat to estimate stability factor Kh until the estimated value of stability factor Kh substantially conforms to an actual stability factor to thereby gradually make the estimated value of stability factor Kh be closer to an actual stability factor.

Further, according to the above-described embodiments, in step 200, a decision is made as to whether or not the vehicle is under the turn running condition and if an affirmative decision is made, the control procedures in step 210 and the following steps are executed. Therefore, it is possible to prevent step 210 and the following steps from being unnecessarily conducted and stability factor Kh from being inaccurately estimated under a situation where the vehicle is not turning and accordingly accurate estimation of t stability factor Kh is impossible.

First Modified Embodiment

Figure 8:
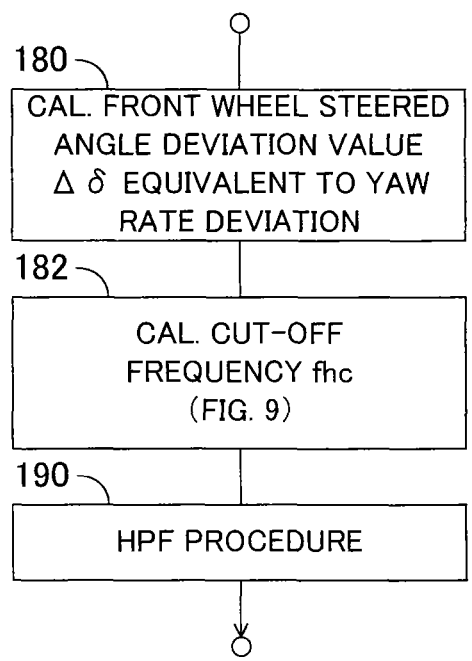
FIG. 8 is a flowchart showing an essential portion of a routine for calculating a stability factor Kh by estimation in a first modified embodiment.

FIG. 8 is a flowchart showing a main portion of a routine for calculating a stability factor Kh by estimation in a first modified embodiment which is configured as a partial modification of the first and second embodiments. In FIG. 8, steps identical to those shown in FIG. 3 are denoted by the same step numbers. The same goes in the flowcharts for the other modified embodiments described hereinafter.

Figure 9:
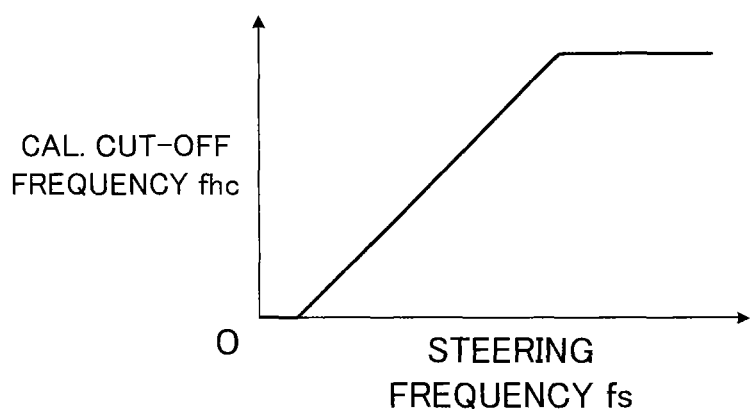
FIG. 9 is a graph showing a relationship between steering frequency fs and a cutoff frequency fhc of a high-pass filtering procedure.

In this first modified embodiment, after completion of step 180, the number of reciprocating steering operations by a driver per unit time is calculated as steering frequency fs in step 182. A cutoff frequency fhc of a high-pass filtering procedure in step 190 is also calculated on the basis of the steering frequency fs from a map corresponding to the graph shown in FIG. 9 so that as the steering frequency fs decreases, the cutoff frequency fhc lowers.

In the high-pass filtering procedure on the vehicle lateral acceleration Gyft and the front wheel steered angle deviation value Δδ equivalent to yaw rate deviation in step 190, cutoff frequency is set to the cutoff frequency fhc calculated in step 182.

In the above-described first and second embodiments, the cutoff frequency fhc of a high-pass filtering procedure in step 190 is constant. Accordingly, if the cutoff frequency fhc is set so high that the influence of zero point offset in the sensors may surely be removed, there arises a risk that stability factor Kh can not be estimated under a situation where the number of reciprocating steering operations by a driver per unit time is small. In contrast, if the cutoff frequency fhc is set so low, there arises a risk that the adverse influence of zero point offset in the sensors cannot be removed in a situation where the number of reciprocating steering operations by a driver per unit time is large.

According to the first modified embodiment, the cutoff frequency fhc is variably set in accordance with steering frequency fs so that as the steering frequency fs is lower, the cutoff frequency fhc decreases. Therefore, the estimation of stability factor Kh can be prevented from being defied in a situation where the number of reciprocating steering operations by a driver per unit time is small while effectively removing the influence of zero point offset in the sensors in a situation where the number of reciprocating steering operations by a driver per unit time is large.

It is to be noted that although the cutoff frequency fhc is calculated on the basis of the steering frequency fs from the map, it may be calculated by a function of the steering frequency fs.

Second Modified Embodiment

Figure 10:
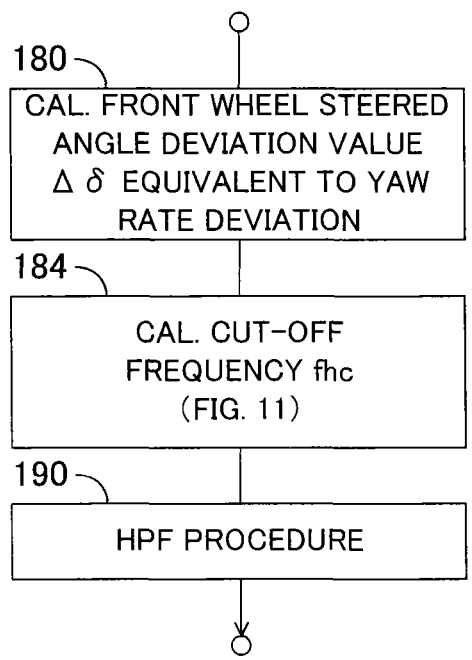
FIG. 10 is a flowchart showing an essential portion of a routine for calculating a stability factor Kh by estimation in a second modified embodiment.

FIG. 10 is a flowchart showing a main portion of a routine for calculating a stability factor Kh by estimation in a second modified embodiment which is configured as a partial modification of the first and second embodiments.

Figure 11:
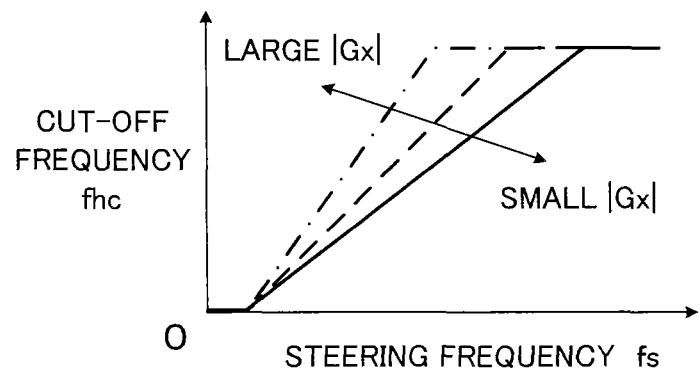
FIG. 11 is a graph showing a relationship among steering frequency fs, a cutoff frequency fhc of a high-pass filtering procedure and an absolute value of longitudinal acceleration Gx of the vehicle.

In this second modified embodiment, after completion of step 180, the number of reciprocating steering operations by a driver per unit time is calculated as steering frequency fs in step 184. A cutoff frequency fhc of a high-pass filtering procedure is also calculated on the basis of the steering frequency fs and longitudinal acceleration Gx of the vehicle from a map corresponding to the graph shown in FIG. 11 so that as the steering frequency fs decreases, the cutoff frequency fhc lowers and as the absolute value of longitudinal acceleration Gx of the vehicle increases, the cutoff frequency fhc also increases.

In the high-pass filtering procedure on the vehicle lateral acceleration Gyft and the front wheel steered angle deviation value Δδ equivalent to yaw rate deviation in step 190, cutoff frequency is set to the cutoff frequency fhc calculated in step 184.

Assume that an error of zero point offset in the steering sensor 34 in connection with steered angle of the front wheels is δ0, and an error of zero point offset in the lateral acceleration sensor 40 in connection with lateral acceleration Gy of the vehicle is Gy0. In addition, assume that an error of zero point offset in the yaw rate sensor 36 in connection with yaw rate γ of the vehicle is γ0. Considering these errors, the front wheel steered angle deviation value Δδ equivalent to yaw rate deviation is represented by the above-mentioned equation 17.

Accordingly, the influences of zero point offsets in the sensors are the second to the fourth terms in the above-mentioned equation 17, that is, "δ0−KhdeGy0L−γ0L/V". Therefore, as the change in vehicle speed V is larger, that is, as the magnitude of longitudinal acceleration Gx of the vehicle is larger, the influences of zero point offsets in the sensors on the change of steady-state standard yaw rate γt increase and, to the contrary, as the magnitude of longitudinal acceleration Gx of the vehicle is lower, the influences of zero point offsets in the sensors on the change of steady-state standard yaw rate γt decrease.

According to the second modified embodiment, the cutoff frequency fhc is also variably set in accordance with longitudinal acceleration Gx of the vehicle so that as the absolute value of longitudinal acceleration Gx of the vehicle is higher, the cutoff frequency fhc of a high-pass filtering procedure increases. Therefore, it is possible not only to achieve the same operation and effect as in the first modified embodiment, but also to effectively remove the influences of zero point offsets in the sensors regardless of the change in vehicle speed V.

It is to be noted that although the cutoff frequency fhc is calculated on the basis of the steering frequency fs and the absolute value of longitudinal acceleration Gx of the vehicle from the map, it may be calculated by a function of the steering frequency fs and the absolute value of longitudinal acceleration Gx of the vehicle.

Third Modified Embodiment

Figure 12:
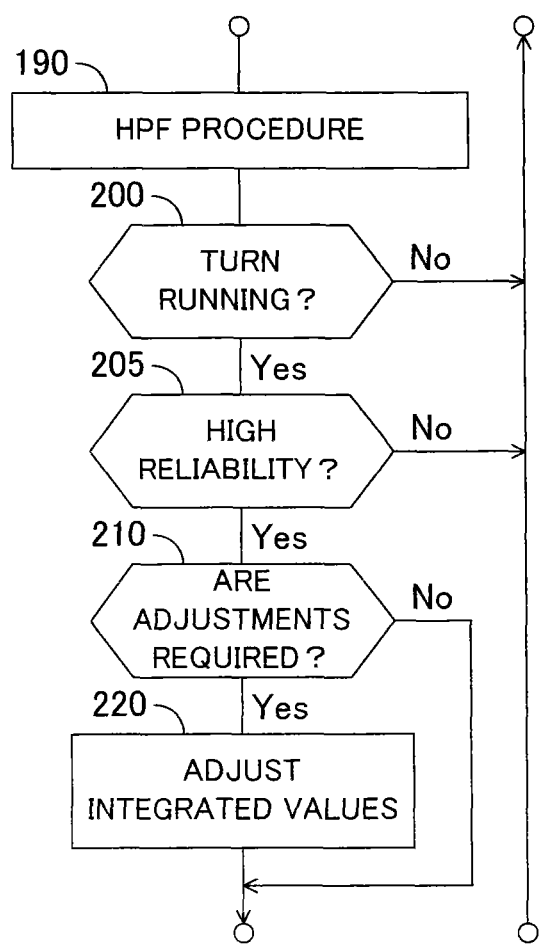
FIG. 12 is a flowchart showing an essential portion of a routine for calculating a stability factor Kh by estimation in a third modified embodiment.
Figure 13:
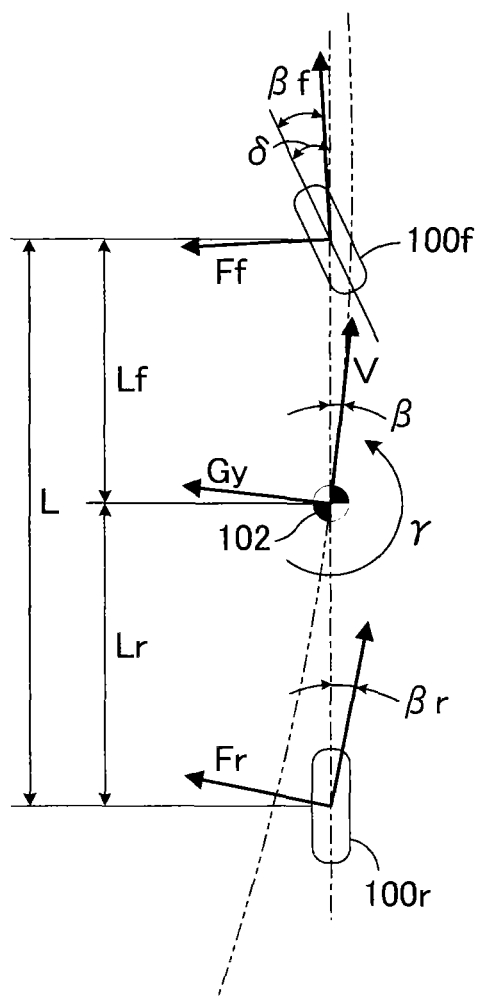
FIG. 13 is an explanatory diagram showing a two wheel model of a vehicle for estimating a stability factor.
Figure 14:
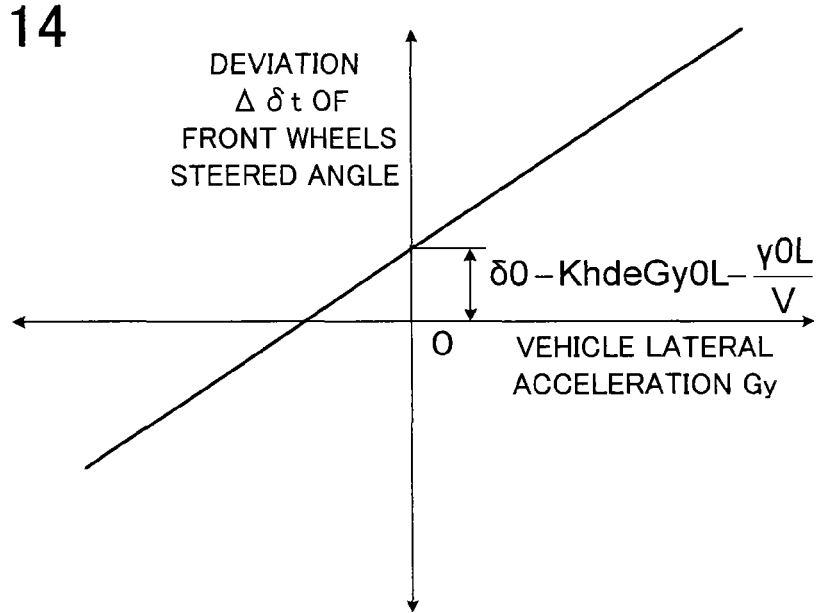
FIG. 14 is a graph showing a relationship between vehicle lateral acceleration Gy and front wheels steered angle deviation Mt.
Figure 15:
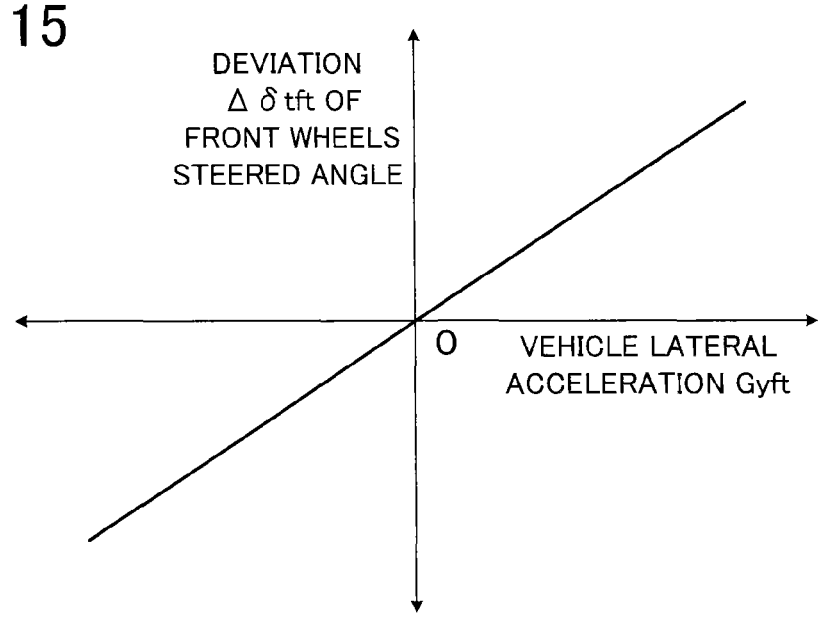
FIG. 15 is a graph showing a relationship between vehicle lateral acceleration Gyft removed of the components having a frequency equal to or lower than a first predetermined value and front wheels steered angle deviation Δδtft removed of the components having a frequency equal to or lower than a second predetermined value.

FIG. 12 is a flowchart showing a main portion of a routine for calculating a stability factor Kh by estimation in a third modified embodiment which is configured as a partial modification of the first and second embodiments.

In this third modified embodiment, if it is decided that the vehicle is under turn condition in step 200, step 205 is conducted prior to step 210. In step 205, a decision is made as to whether or not the vehicle is under the condition that allows to estimate a stability factor Kh with high reliability. If a negative decision is made, the control returns to step 20. If an affirmative decision is made, the control proceeds to step 210.

It is to be understood that a decision may be made that the vehicle is under the condition that allows to estimate a stability factor Kh with high reliability when all of the under-mentioned (B1) and (B2) are satisfied.

(B1) The road is not rough.
(B2) The vehicle is not under braking.

It is to be understood that the condition B1 is based on the consideration that at a rough road, actual yaw rate γ includes noise and tire grip to road surface may fluctuate. The condition B2 is based on the consideration that in the calculation of steady-state standard yaw rate γt according to the above-mentioned equation 11, no influence of braking force is presupposed.

According to the third modified embodiment, therefore, stability factor Kh can more accurately be estimated as compared to the first and second embodiments or the first and second modified embodiments in which a decision is not conducted as to whether or not the vehicle is under the condition that allows estimation of a stability factor Kh with high reliability.

While the present invention has been described in detail with reference to the above particular embodiments, it will be apparent to those skilled in the art that the present invention is not limited thereto, but may be embodied in various other forms without departing from the scope of the invention.

For example, in the above-described embodiments and modified embodiments, a lateral acceleration acquiring means which acquires information regarding a lateral acceleration Gy of a vehicle is a lateral acceleration sensor 40, a lateral acceleration sensor may be a part of vehicle travel control device and a lateral acceleration acquiring means may be the electronic control unit 30 itself which acquires information regarding a lateral acceleration Gy of a vehicle from the electronic control unit 30 by communication.

While a lateral acceleration Gy of a vehicle is a value detected by a lateral acceleration sensor 40, it may be substituted with a product of a yaw rate vehicle γ detected by a yaw rate sensor 36 and a vehicle speed V detected by a vehicle speed sensor 42.

In the above-described second embodiment, an estimated longitudinal acceleration Gxh of a vehicle is calculated on the basis of a master cylinder pressure Pm or an accelerator opening Acc, and a vehicle weight W is estimated on the basis of a difference between the estimated longitudinal acceleration Gxh and a longitudinal acceleration Gx. However, a vehicle weight W may be estimated in any manner. For example, in a vehicle having a load sensor or a height sensor in each suspension, a vehicle weight W may be estimated on the basis of detected values.

In the above-described embodiments and modified embodiments, in step 180, an equivalent value converted to steered angle deviation of the front wheels is calculated which is derived by converting the deviation between the transient yaw rate γtr and the actual yaw rate γ to the steered angle deviation of the front wheels. However, a high-pass filtering procedure may be conducted on the deviation between the transient yaw rate γtr and the actual yaw rate γ to calculate a band-pass filtered yaw rate deviation Δγbpf; a ratio of the yaw rate deviation Δγbpf relative to the integrated value ΔGya of the vehicle lateral acceleration Gyftbpf may be calculated in place of the ratio Δδa/ΔGya of the integrated values; and an estimated value of stability factor Kh may be calculated in accordance with the under-mentioned equation 29 on the basis of the ratio Δδa/ΔGya of the integrated values.

$$Kh=Kh0+(\Delta\gamma bpf/\Delta Gya)/L \quad (29)$$

When an estimated value of stability factor Kh is calculated in accordance with the equation 29, it is preferable to set a plurality of vehicle speed areas and to calculate an estimated value of stability factor for each vehicle speed area. It is also preferable to calculate a convergence degree of the estimated value of stability factor for each vehicle speed area and to set a dead zone of vehicle motion control for each vehicle speed area. Further, it is preferable to set stability factor Kh which is used to calculate a target yaw rate in vehicle motion control to an estimated value for each vehicle speed area.

In the above-described embodiments and modified embodiments, an adjustment gain Gaj is calculated as larger one of the first gain (Δδamin/|presentΔδa|1) and the second gain (ΔGyamin/|presentΔGya|) within a rage not larger than 1. However, one of the first and the second gains may be omitted and the other of the first and the second gains may be set to an adjustment gain Gaj.

The invention claimed is:

1. A method for estimating a loading state of a vehicle, comprising:
    predetermining a relationship among various loading states, stability factor of the vehicle, and lateral acceleration of the vehicle;
    storing the relationship as a reference relationship;
    acquiring information regarding a lateral acceleration of the vehicle;
    calculating an estimated value of the stability factor of the vehicle on the basis of vehicle travelling data when turning;
    estimating a loading state of the vehicle on the basis of a relationship between the estimated value of the stability factor and the lateral acceleration of the vehicle which is at the same point in time as the vehicle travelling data which were provided for the calculation of the estimated value and the reference relationship; and modifying a vehicle travel control of the vehicle in accordance with the loading state.

2. The method for estimating a loading state of a vehicle according to claim 1, wherein the loading state is estimated as one of the various loading states.

3. The method for estimating a loading state of a vehicle according to claim 1, wherein with an index value of the deviation between a transient yaw rate of the vehicle having a relationship of first order delay relative to a standard yaw rate of the vehicle and an actual yaw rate of the vehicle being referred to as a yaw rate deviation index value, the stability factor of the vehicle is estimated on the basis of the relationship between a vehicle lateral acceleration removed of the components having a frequency equal to or lower than a first predetermined value and a yaw rate deviation index value removed of the components having a frequency equal to or lower than a second predetermined value.

4. A method for estimating a loading state of a vehicle, comprising:
predetermining relationships among various loading states, stability factor of the vehicle, and lateral acceleration of the vehicle for a plurality of sections in vehicle classification by weight;
storing the relationships as reference relationships;
acquiring information regarding a lateral acceleration of the vehicle;
calculating an estimated value of the stability factor of the vehicle on the basis of vehicle travelling data when turning;
acquiring information regarding a weight of the vehicle;
determining a section in the vehicle classification by weight and a reference relationship on the basis of the weight of the vehicle;
estimating a loading state of the vehicle on the basis of the relationship between the estimated value of the stability factor and the lateral acceleration of the vehicle which is at the same point in time as the vehicle travelling data which were provided for the calculation of the estimated value and the determined reference relationship; and
modifying a vehicle travel control of the vehicle in accordance with the loading state.

5. The method for estimating a loading state of a vehicle according to claim 4, wherein the loading state is estimated as one of the various loading states.

6. The method for estimating a loading state of a vehicle according to claim 4, wherein with an index value of the deviation between a transient yaw rate of the vehicle having a relationship of first order delay relative to a standard yaw rate of the vehicle and an actual yaw rate of the vehicle being referred to as a yaw rate deviation index value, the stability factor of the vehicle is estimated on the basis of the relationship between a vehicle lateral acceleration removed of the components having a frequency equal to or lower than a first predetermined value and a yaw rate deviation index value removed of the components having a frequency equal to or lower than a second predetermined value.

7. A device for estimating a loading state of a vehicle, comprising:
at least one electronic control unit configured to:
store a predetermined relationship among various loading states, stability factor of the vehicle, and lateral acceleration of the vehicle as a reference relationship;
acquire information regarding a lateral acceleration of the vehicle;
calculate an estimated value of the stability factor of the vehicle on the basis of vehicle travelling data when turning;
estimate a loading state of the vehicle on the basis of the relationship between the estimated value of the stability factor and the lateral acceleration of the vehicle which is at the same point in time as the vehicle travelling data which were provided for the calculation of the estimated value and the reference relationship; and
modify a vehicle travel control of the vehicle in accordance with the loading state.

8. The device for estimating a loading state of a vehicle according to claim 7, wherein the ECU is configured to estimate the loading state as one of the various loading states.

9. The device for estimating a loading state of a vehicle according to claim 7, wherein with an index value of the deviation between a transient yaw rate of the vehicle having a relationship of first order delay relative to a standard yaw rate of the vehicle and an actual yaw rate of the vehicle being referred to as a yaw rate deviation index value, the at least one ECU is configured to calculate an estimated value of the stability factor of the vehicle on the basis of the relationship between a vehicle lateral acceleration removed of the components having frequency equal to or lower than a first predetermined value and a yaw rate deviation index value removed of the components having frequency equal to or lower than a second predetermined value.

10. A device for estimating a loading state of a vehicle, comprising:
at least one electronic control unit (ECU) configured to:
store predetermined relationships among various loading states, stability factor of the vehicle, and lateral acceleration of the vehicle as reference relationships for a plurality of sections in vehicle classification by weight;
acquire information regarding a lateral acceleration of the vehicle;
calculate an estimated value of the stability factor of the vehicle on the basis of vehicle travelling data when turning; and
acquire information regarding a weight of the vehicle;
determine a section in the vehicle classification by weight and a reference relationship on the basis of the weight of the vehicle;
estimate a loading state of the vehicle on the basis of the relationship between the estimated value of the stability factor and the lateral acceleration of the vehicle which is at the same point in time as the vehicle travelling data which were provided for the calculation of the estimated value and the determined reference relationship; and
modify a vehicle travel control of the vehicle in accordance with the loading state.

11. The device for estimating a loading state of a vehicle according to claim 10, wherein the at least one ECU is configured to estimate the loading state as one of the various loading states.

12. The device for estimating a loading state of a vehicle according to claim 10, wherein with an index value of the deviation between a transient yaw rate of the vehicle having a relationship of first order delay relative to a standard yaw rate of the vehicle and an actual yaw rate of the vehicle being referred to as a yaw rate deviation index value, the at least one ECU is configured to calculate an estimated value of the stability factor of the vehicle on the basis of the relationship between a vehicle lateral acceleration removed of the components having frequency equal to or lower than a first predetermined value and a yaw rate deviation index value removed of the components having frequency equal to or lower than a second predetermined value.

* * * * *